(12) United States Patent
Maruyama

(10) Patent No.: US 11,194,931 B2
(45) Date of Patent: Dec. 7, 2021

(54) SERVER DEVICE, INFORMATION MANAGEMENT METHOD, INFORMATION PROCESSING DEVICE, AND INFORMATION PROCESSING METHOD

(71) Applicant: SONY CORPORATION, Tokyo (JP)

(72) Inventor: Shinya Maruyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 180 days.

(21) Appl. No.: 16/463,241

(22) PCT Filed: Oct. 5, 2017

(86) PCT No.: PCT/JP2017/036291
§ 371 (c)(1),
(2) Date: May 22, 2019

(87) PCT Pub. No.: WO2018/123190
PCT Pub. Date: Jul. 5, 2018

(65) Prior Publication Data
US 2019/0325160 A1  Oct. 24, 2019

(30) Foreign Application Priority Data
Dec. 28, 2016 (JP) .............................. JP2016-254850

(51) Int. Cl.
*G06F 21/62* (2013.01)
*G06F 21/57* (2013.01)
(Continued)

(52) U.S. Cl.
CPC ........ *G06F 21/6254* (2013.01); *G06F 21/577* (2013.01); *G06F 21/602* (2013.01);
(Continued)

(58) Field of Classification Search
CPC .. G06F 21/6254; G06F 21/577; G06F 21/602; G06F 21/606; H04L 9/0877; H04L 2209/42
See application file for complete search history.

(56) References Cited

U.S. PATENT DOCUMENTS 10,554,627 B2 * 2/2020 Jeong ................. H04L 63/0876
2004/0133547 A1 * 7/2004 Doi ........................ G06Q 30/02
(Continued)

FOREIGN PATENT DOCUMENTS

CA     2821438 A1    7/2012
CA     2837848 A1   12/2012
(Continued)

OTHER PUBLICATIONS

International Search Report and Written Opinion of PCT Application No. PCT/JP2017/036291, dated Jan. 9, 2018, 10 pages of ISRWO.
(Continued)

*Primary Examiner* — Shahriar Zarrineh
(74) *Attorney, Agent, or Firm* — Chip Law Group

(57) ABSTRACT

Provided is a server device including a risk value acquisition unit that acquires a risk value in a case in which a user's anonymous information leaks and a processing execution unit that associates an anonym ID for identifying the anonymous information with the anonymous information. In a case in which the risk value exceeds a predetermined threshold value, the processing execution unit executes at least any of processing of switching the anonym ID associated with the anonymous information or processing of differentiating anonym IDs associated with a plurality of pieces of division information obtained through division of the anonymous information.

17 Claims, 17 Drawing Sheets

(51) Int. Cl.
*G06F 21/60* (2013.01)
*H04L 9/08* (2006.01)
(52) U.S. Cl.
CPC .......... *G06F 21/606* (2013.01); *H04L 9/0877* (2013.01); *H04L 2209/42* (2013.01)

(56) References Cited

U.S. PATENT DOCUMENTS

| | | | | |
|---|---|---|---|---|
| 2006/0136253 | A1* | 6/2006 | Yokota | G06Q 40/00 705/51 |
| 2007/0261114 | A1* | 11/2007 | Pomerantsev | G06F 21/33 726/12 |
| 2009/0119763 | A1* | 5/2009 | Park | H04L 63/0815 726/8 |
| 2010/0077006 | A1* | 3/2010 | El Emam | G06F 21/6254 707/785 |
| 2010/0088753 | A1* | 4/2010 | Ayres | G06F 21/41 726/9 |
| 2010/0146603 | A1* | 6/2010 | Lee | H04L 63/0407 726/6 |
| 2011/0258206 | A1* | 10/2011 | El Emam | G06F 21/577 707/754 |
| 2013/0269038 | A1* | 10/2013 | Takahashi | H04L 9/32 726/26 |
| 2014/0122442 | A1* | 5/2014 | Takenouchi | G06F 16/2365 707/687 |
| 2014/0181988 | A1* | 6/2014 | Umeda | G06F 21/6254 726/26 |
| 2014/0189858 | A1* | 7/2014 | Chen | G06F 16/21 726/22 |
| 2014/0304148 | A1* | 10/2014 | Flanagan | G06Q 20/04 705/39 |
| 2014/0324915 | A1* | 10/2014 | Gkoulalas-Divanis | G06F 16/9024 707/803 |
| 2015/0007249 | A1* | 1/2015 | Bezzi | G06F 21/6227 726/1 |
| 2015/0067118 | A1* | 3/2015 | Gatto | H04L 63/06 709/223 |
| 2015/0356257 | A1* | 12/2015 | Wright | G16H 40/20 705/51 |
| 2016/0323102 | A1* | 11/2016 | Freudiger | H04L 9/0869 |
| 2017/0083719 | A1* | 3/2017 | Scaiano | G06F 16/903 |
| 2017/0300911 | A1* | 10/2017 | Alnajem | G06Q 10/0635 |
| 2018/0227301 | A1* | 8/2018 | Maruyama | H04L 63/10 |

FOREIGN PATENT DOCUMENTS

| | | |
|---|---|---|
| JP | 2013-109577 A | 6/2013 |
| JP | 2014-026305 A | 2/2014 |
| JP | 2014-153943 A | 8/2014 |
| JP | 2014-164476 A | 9/2014 |
| WO | 2011/142327 A1 | 11/2011 |
| WO | 2012/090628 A1 | 7/2012 |
| WO | 2012/165518 A1 | 12/2012 |

OTHER PUBLICATIONS

Arai, et al., "Efficient k-Anonymization by Combining Clustering and Space Partitioning", DBSJ Japanese Journal, vol. 13-J, No. 1, Oct. 2014, pp. 72-77. (English Abstract only).
Arai, et al., "Efficient k-Anonymization by Combining Clustering and Space Partitioning", DBSJ Japanese Journal, vol. 13-J, No. 1, Oct. 2014, 08 pages.
Office Action for JP Patent Application No. 2018-558827 dated Jun. 15, 2021, 04 pages of Office Action and 04 pages of English Translation.
Arai, et al. "Efficient k-anonymization by using both clustering and space division and space division", Journal of Japan Database Society, Japan Society, vol. 13 to J, No. 1, Oct. 2014, pp. 72-77.

* cited by examiner

SERVER DEVICE, INFORMATION MANAGEMENT METHOD, INFORMATION PROCESSING DEVICE, AND INFORMATION PROCESSING METHOD

CROSS REFERENCE TO RELATED APPLICATIONS

This application is a U.S. National Phase of International Patent Application No. PCT/JP2017/036291 filed on Oct. 5, 2017, which claims priority benefit of Japanese Patent Application No. JP 2016-254850 filed in the Japan Patent Office on Dec. 28, 2016. Each of the above-referenced applications is hereby incorporated herein by reference in its entirety.

TECHNICAL FIELD

The present disclosure relates to a server device, an information management method, an information processing device, an information processing method, and a program.

BACKGROUND ART

As information related to users, various kinds of information may exist. For example, information with anonymity (hereinafter, also referred to as "anonymous information") may exist as information related to users. Also, information that enables identification of related users (hereinafter, also referred to as "real name information") may exist as information related to users. In a case in which anonymous information and real name information are stored in an associated state in a server, and the anonymous information and the real name information leak from the server, there is a concern that a third person who acquires the anonymous information and the real name information may cause damage to the users.

Therefore, technologies for managing anonymous information in a separate state from real name information have been developed in recent years. For example, a technology for preventing a correspondence between real name information and anonymous information from being easily recognized by a third person even in a case in which anonymous information has leaked by separating a server device that stores the real name information (hereinafter, also referred to as a "real name information server") from a server device that stores anonymous information (hereinafter, also referred to as a "anonymous information server") is disclosed (see Patent Literature 1, for example).

CITATION LIST

Patent Literature

Patent Literature 1: JP 2013-109577A

SUMMARY OF INVENTION

Technical Problem

However, it is desirable to provide a technology that makes it difficult to identify to which user leaked anonymous information relates even in a case in which the anonymous information has leaked.

Solution to Problem

According to the present disclosure, there is provided a server device including: a risk value acquisition unit that acquires a risk value in a case in which a user's anonymous information leaks; and a processing execution unit that associates an anonym ID for identifying the anonymous information with the anonymous information. In a case in which the risk value exceeds a predetermined threshold value, the processing execution unit executes at least any of processing of switching the anonym ID associated with the anonymous information or processing of differentiating anonym IDs associated with a plurality of pieces of division information obtained through division of the anonymous information.

According to the present disclosure, there is provided an information management method including: acquiring a risk value in a case in which a user's anonymous information leaks; associating an anonym ID for identifying the anonymous information with the anonymous information; and in a case in which the risk value exceeds a predetermined threshold value, executing, by a processor, at least any of processing of switching the anonym ID associated with the anonymous information or processing of differentiating anonym IDs associated with a plurality of pieces of division information obtained through division of the anonymous information.

According to the present disclosure, there is provided a program for causing a computer to function as a server device including: a risk value acquisition unit that acquires a risk value in a case in which a user's anonymous information leaks; and a processing execution unit that associates an anonym ID for identifying the anonymous information with the anonymous information. In a case in which the risk value exceeds a predetermined threshold value, the processing execution unit executes at least any of processing of switching the anonym ID associated with the anonymous information or processing of differentiating anonym IDs associated with a plurality of pieces of division information obtained through division of the anonymous information.

According to the present disclosure, there is provided an information processing device including: an anonym ID generation unit that generates an anonym ID for identifying a user's anonymous information; and an anonym ID provision unit that provides the anonym ID and the anonymous information to a server device. In a case in which a risk value when the anonymous information leaks exceeds a predetermined threshold value, the anonym ID generation unit executes at least any of processing of newly generating an anonym ID associated with the anonymous information or processing of generating anonym IDs associated with a plurality of pieces of division information obtained through division of the anonymous information.

According to the present disclosure, there is provided an information processing method including: generating an anonym ID for identifying a user's anonymous information; providing the anonym ID and the anonymous information to a server device; and in a case in which a risk value when the anonymous information leaks exceeds a predetermined threshold value, executing, by a processor, at least any of processing of newly generating an anonym ID associated with the anonymous information or processing of generating anonym IDs associated with a plurality of pieces of division information obtained through division of the anonymous information.

According to the present disclosure, there is provided a program for causing a computer to function as an information processing device including: an anonym ID generation unit that generates an anonym ID for identifying a user's anonymous information; and an anonym ID provision unit that provides the anonym ID and the anonymous information to a server device. In a case in which a risk value when the anonymous information leaks exceeds a predetermined threshold value, the anonym ID generation unit executes at least any of processing of newly generating an anonym ID associated with the anonymous information or processing of generating anonym IDs associated with a plurality of pieces of division information obtained through division of the anonymous information.

Advantageous Effects of Invention

As described above, the present disclosure provides a technology that makes it difficult to identify to which user leaked anonymous information relates even in a case in which the anonymous information has leaked. Note that the effects described above are not necessarily limitative. With or in the place of the above effects, there may be achieved any one of the effects described in this specification or other effects that may be grasped from this specification.

DESCRIPTION OF EMBODIMENTS

Figure 1:
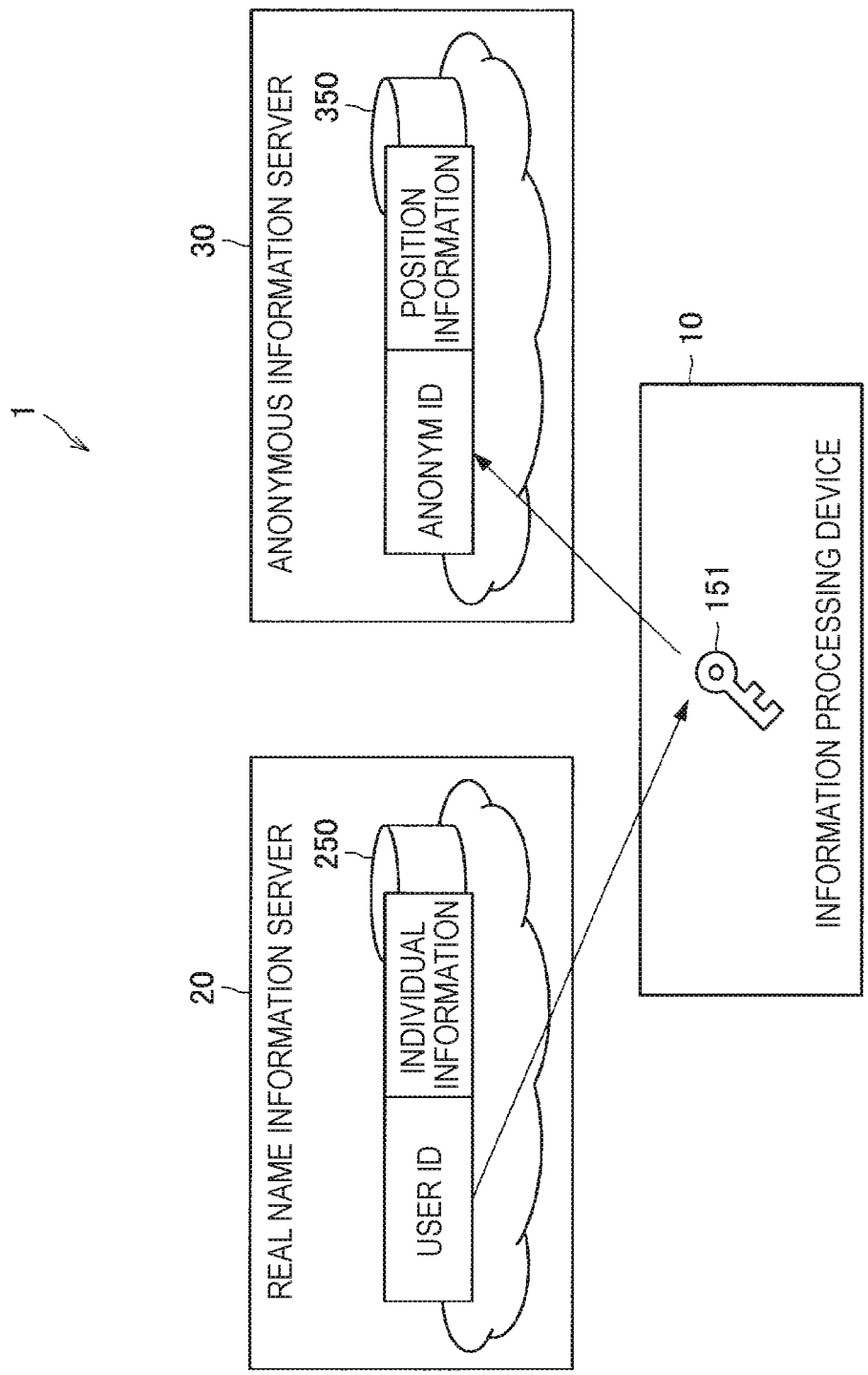
FIG. 1 is a diagram illustrating a configuration example of an information processing system according to an embodiment of the present disclosure.

Hereinafter, (a) preferred embodiment (s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in the present specification and the drawings, structural elements that have substantially the same or similar function and structure are sometimes distinguished from each other using different numbers after the same reference sign. However, when there is no need in particular to distinguish structural elements that have substantially the same or similar function and structure, the same reference sign alone is attached. Further, there are cases in which similar structural elements of different embodiments are distinguished by adding the same reference numeral followed by different letters. However, in a case where it is not necessary to particularly distinguish each of similar structural element, only the same reference signs are attached.

Note that description will be given in the following order.
0. Outline
1. Details of embodiment
 1.1. Functional configuration example of information processing device
 1.2. Functional configuration example of real name information server
 1.3. Functional configuration example of anonymous information server
 1.4. Overall functions
 1.5. Operation examples
2. Description of modification example
3. Hardware configuration example
4. Conclusion 0. Outline First, an outline of an embodiment of the present disclosure will be described. As information related to users, various kinds of information may exist. For example, anonymous information exists as information related to users. Also, real name information exists as information related to users. In a case in which anonymous information and real name information are stored in a server in an associated state and the anonymous information and the real name information leak in the associated state from the server, there is a concern that a third person who acquires the anonymous information and the real name information may cause damage to the users.

Therefore, technologies for managing anonymous information in a separate state from real name information have been developed in recent years. FIG. 1 is a diagram illustrating a configuration example of an information processing system according to the embodiment of the present disclosure. Referring to FIG. 1, an information processing system 1 includes an information processing device 10, a real name information server 20 that stores real name information, and an anonymous information server 30 that stores anonymous information. In this manner, it is possible to prevent a correspondence between the real name information and the anonymous information from being easily recognized by a third person even in a case in which the anonymous information has leaked, by separating the real name information server 20 from the anonymous information server 30.

The real name information server 20 includes a storage unit 250, and information for identifying users (hereinafter, also referred to as "user IDs") and individual information of users as an example of user's real name information are stored in the storage unit 250 in an associated state. Also, the anonymous information server 30 includes a storage unit 350, and information for identifying user's anonymous information (hereinafter, also referred to as "anonym IDs") and user's position information as an example of user's anonymous information are stored in the storage unit 350 in an associated state.

Note that in the embodiment of the present disclosure, a case in which position information is used as an example of anonymous information will be mainly described. However, the anonymous information is not limited to position information. For example, the anonymous information may be certain confidential data. The secret data may be any sensitive information that users do not desire to let other persons know, may be any information related to users' lives, may be any information related to users' health, and may be any information related to users' bodies (for example, biological information such as pulse waves and the like).

A user ID and an anonym ID are mapped (associated with each other) in the information processing device 10. In the specification, a case in which the information processing device 10 is a user's own device will be considered. In such a case, since the user IDs and anonym IDs are not mapped in a cloud (server) (since there is no correspondence between individual information and position information), a correspondence between real name information and anonymous information is not able to be recognized by a third person unless the information leaks from the user's own device. However, the information processing device 10 may be a server rather than the user's own device.

As illustrated in FIG. 1, the information processing device 10 holds a key 151 for recognizing a correspondence between the user ID and the anonym ID (hereinafter, also referred to as a "mapping key") and can identify the confidential ID associated with the user ID using the mapping key 151 in one example. Note that the key is not essential for identifying the anonym ID associated with the user ID. For example, it is only necessary to save a database or a file including a pair of a user ID and an anonym ID generated using random numbers. Hereinafter, a technology for making it difficult to identify to which user leaked position information relates even in a case in which the position information has leaked, by contriving association of the anonym ID with the position information will be described.

The outline of the embodiment of the present disclosure has been described above.

1. Details of Embodiment

Next, details of the embodiment of the present disclosure will be described.

1.1. Functional Configuration Example of Information Processing Device

Figure 2:
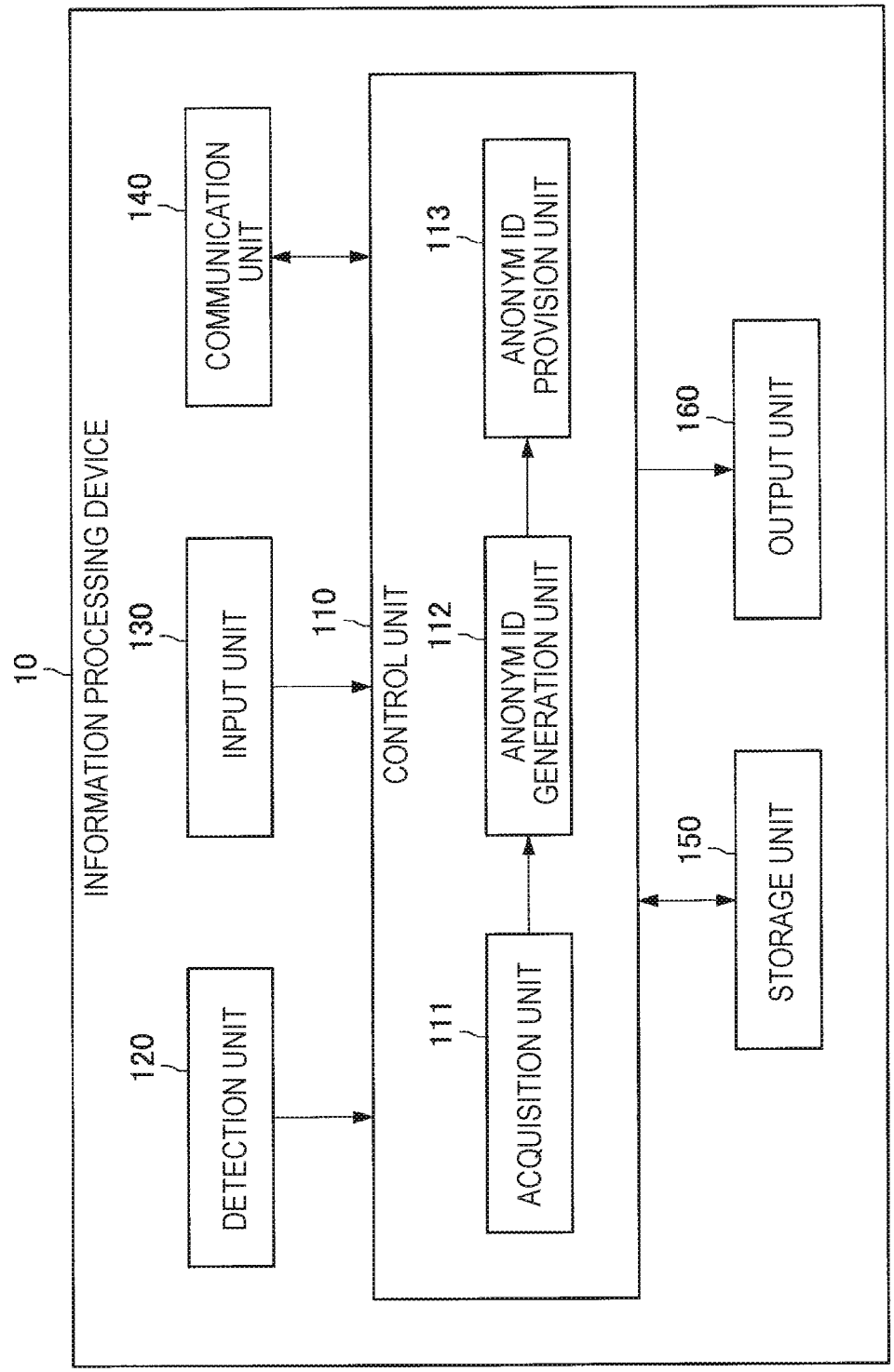
FIG. 2 is a diagram illustrating a functional configuration example of an information processing device according to the embodiment.

First, a functional configuration example of an information processing device 10 according to the embodiment of the present disclosure will be described. FIG. 2 is a diagram illustrating the functional configuration example of the information processing device 10 according to the embodiment of the present disclosure. As illustrated in FIG. 2, the information processing device 10 includes a control unit 110, a detection unit 120, an input unit 130, a communication unit 140, a storage unit 150, and an output unit 160.

Note that in the specification, an example in which a control unit 110, a detection unit 120, an input unit 130, a communication unit 140, a storage unit 150, and an output unit 160 are present in the same device (information processing device 10) will be mainly described. However, positions at which these blocks are present are not particularly limited. For example, a part of these blocks may exist in a server or the like as will be described later.

The control unit 110 controls each of the units of the information processing device 10. As illustrated in FIG. 2, the control unit 110 includes an acquisition unit 111, an anonym ID generation unit 112, and an anonym ID provision unit 113. These functional blocks will be described later in detail. Note that the control unit 110 may be constituted by, for example, a central processing unit (CPU) or the like. In a case where the control unit 110 is constituted by a processing device such as CPU, the processing device may be constituted by an electronic circuit.

The detection unit 120 has various sensors and can acquire sensing data through sensing performed by the various sensors. In the embodiment of the present disclosure, the detection unit 120 includes a GPS sensor capable of receiving a global positioning system (GPS) signal and can measure a latitude, a longitude, and an altitude of the information processing device 10 using the GPS sensor.

The input unit 130 detects a user's operation and outputs the detected operation to the control unit 110. For example, in a case where the input unit 130 is constituted by a touch panel, the user's operation may be equivalent to an operation performed on the touch panel (for example, a tap operation, a drag operation, or the like). However, the input unit 130 may be constituted by hardware other than a touch panel (for example, a button or the like). Alternatively, the input unit 130 may be constituted by a microphone, and voice may be detected as an operation by the microphone.

Figure 17:
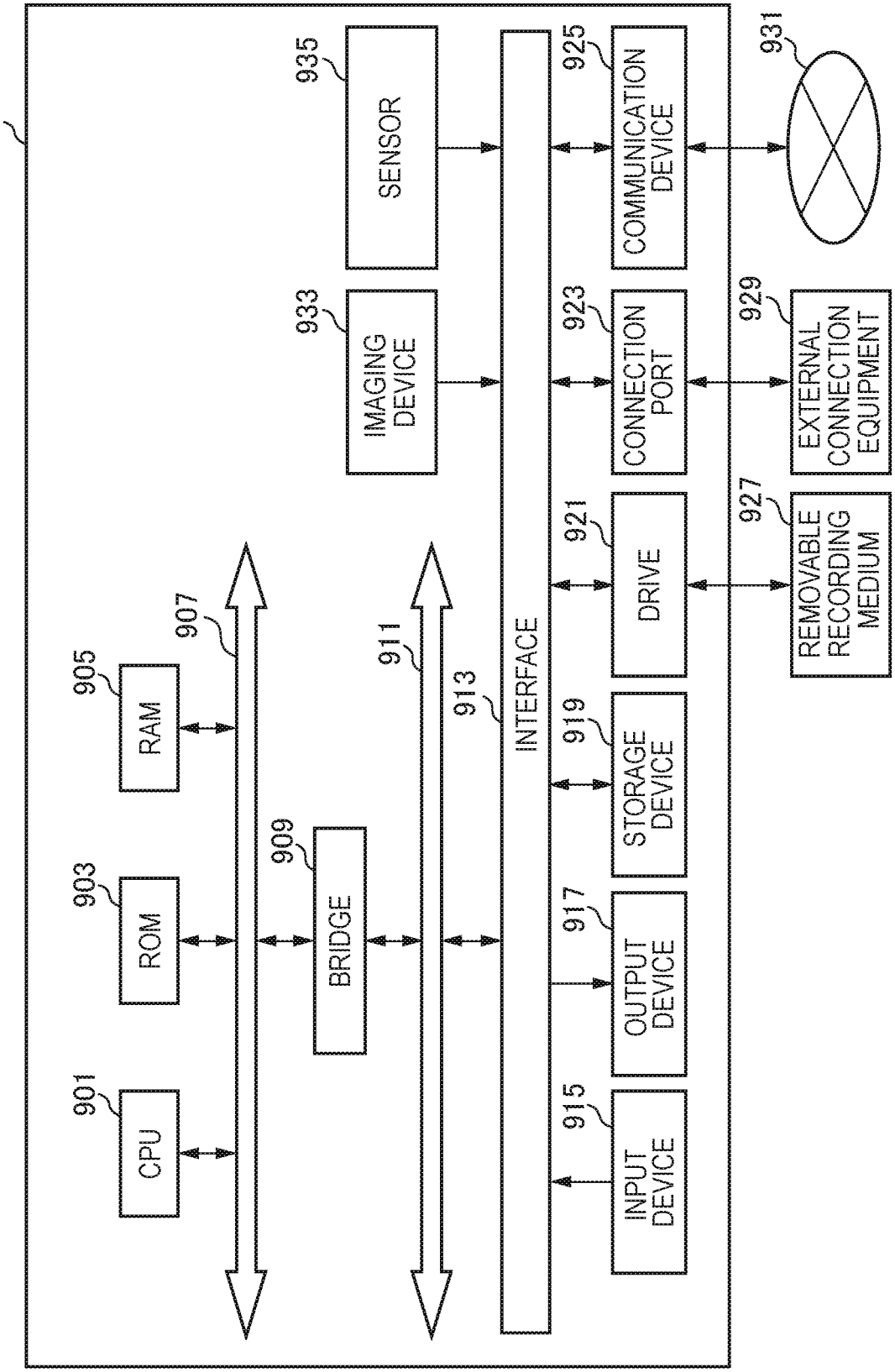
FIG. 17 is a block diagram illustrating a hardware configuration example of the information processing device according to the embodiment.

The communication unit 140 has a function of performing communication with the real name information server 20 and the anonymous information server 30. For example, the communication unit 140 includes a communication interface. For example, the communication unit 140 can communicate with the real name information server 20 and the anonymous information server 30 via a communication network 931 (FIG. 17).

The storage unit 150 is a recording medium that stores programs to be executed by the control unit 110 and stores data necessary for the execution of the programs. In addition, the storage unit 150 transitorily stores data to perform computation by the control unit 110. The storage unit 150 may be a magnetic storage device, a semiconductor storage device, an optical storage device, or a magneto-optical storage device.

The output unit 160 outputs various types of information. For example, the output unit 160 may include a display capable of performing display which is visually recognizable by the user, and the display may be a projector, a liquid crystal display, or an organic electro-luminescence (EL) display. Also, the output unit 160 may include a sound output device. Alternatively, the output unit 160 may include a touch feeling presenting device that presents a touch feeling to the user.

The functional configuration example of the information processing device 10 according to the embodiment of the present disclosure has been described above.

1.2. Functional Configuration Example of Real Name Information Server

Figure 3:
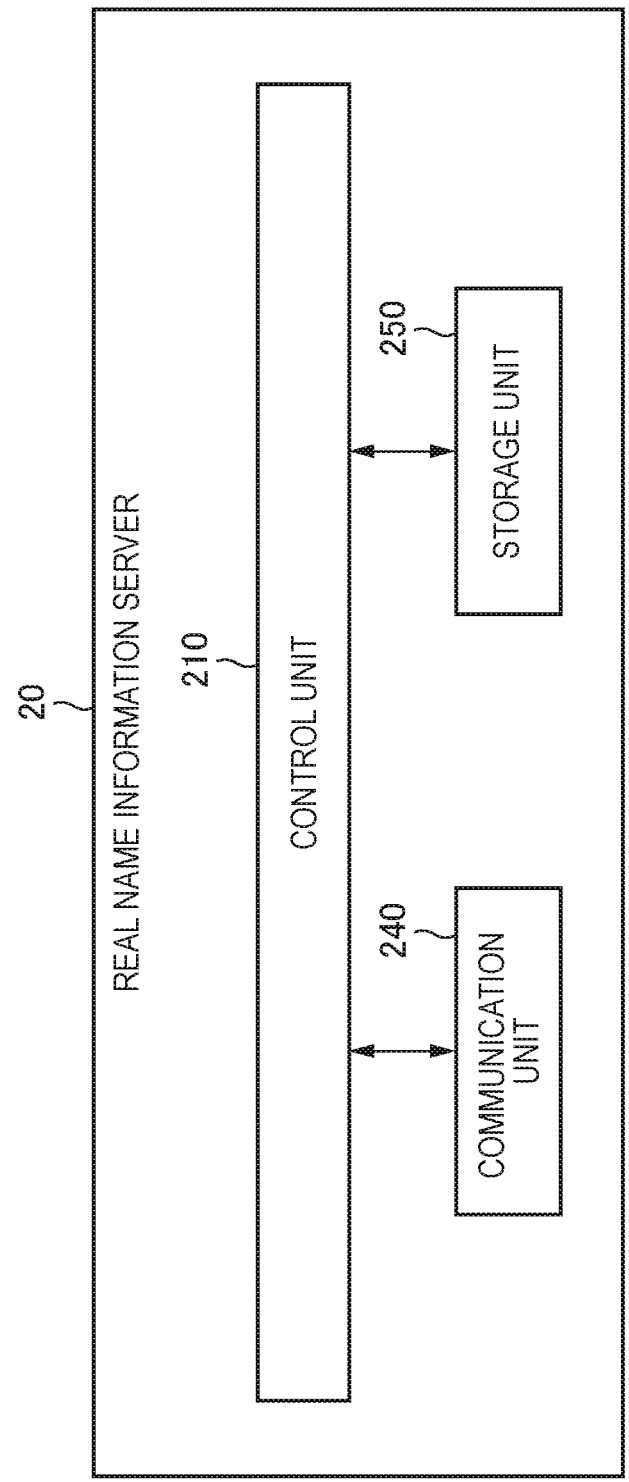
FIG. 3 is a diagram illustrating a functional configuration example of a real name information server according to the embodiment.

Next, a functional configuration example of the real name information server 20 according to the embodiment of the present disclosure will be described. FIG. 3 is a diagram illustrating a functional configuration example of the real name information server 20 according to the embodiment of the present disclosure. As illustrated in FIG. 3, the real name information server 20 has a control unit 210, a communication unit 240, and a storage unit 250.

Note that in the specification, an example in which the control unit 210, the communication unit 240, and the storage unit 250 are present in the same device (real name information server 20) will be mainly described. However, positions at which these blocks are present are not particularly limited. For example, a part of these blocks may exist in another server or the like as will be described later.

The control unit 210 controls each of the units of real name information servers 20. The control unit 210 may be constituted by, for example, a central processing unit (CPU) or the like. In a case where the control unit 210 is constituted by a processing device such as CPU, the processing device may be constituted by an electronic circuit.

The communication unit 240 has a function of communicating with the information processing device 10. For example, the communication unit 240 includes a communication interface. For example, the communication unit 240 can communicate with the information processing device 10 via a communication network 931 (FIG. 17).

The storage unit 250 is a recording medium that stores programs to be executed by the control unit 210 and stores data necessary for the execution of the programs. In addition, the storage unit 250 transitorily stores data to perform computation by the control unit 210. The storage unit 250 may be a magnetic storage device, a semiconductor storage device, an optical storage device, or a magneto-optical storage device.

The functional configuration example of the real name information server 20 according to the embodiment of the present disclosure has been described above.

1.3. Functional Configuration Example of Anonymous Information Server

Figure 4:
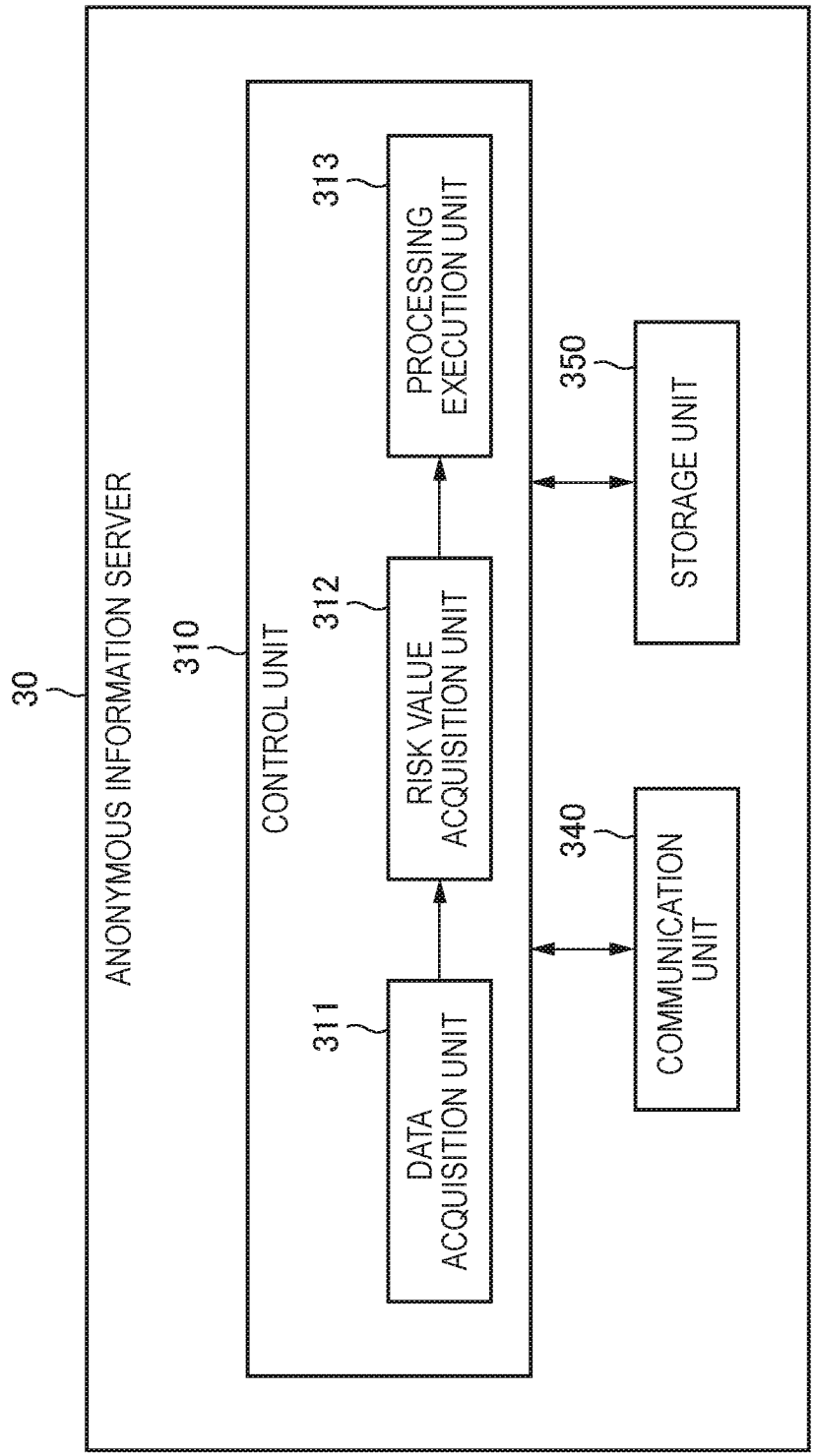
FIG. 4 is a diagram illustrating a functional configuration example of an anonymous information server according to the embodiment.

Next, a functional configuration example of the anonymous information server 30 according to the embodiment of the present disclosure will be described. FIG. 4 is a diagram illustrating a functional configuration example of the anonymous information server 30 according to the embodiment of the present disclosure. As illustrated in FIG. 4, the anonymous information server 30 has a control unit 310, a communication unit 340, and a storage unit 350.

Note that in the specification, an example in which the control unit 310, the communication unit 340, and the storage unit 350 are present in the same device (anonymous information server 30) will be mainly described. However, positions at which these blocks are present are not particularly limited. For example, a part of these blocks may exist in another server or the like as will be described later.

The control unit 310 executes control on each part of the anonymous information server 30. As illustrated in FIG. 4, the control unit 310 includes a data acquisition unit 311, a risk value acquisition unit 312, and a processing execution unit 313. Details of these respective functional blocks will be described later. Note that the control unit 310 may be constituted by, for example, a central processing unit (CPU) or the like. In a case where the control unit 310 is constituted by a processing device such as CPU, the processing device may be constituted by an electronic circuit.

The communication unit 340 has a function of communicating with the information processing device 10. For example, the communication unit 340 includes a communication interface. For example, the communication unit 340 can communicate with the information processing device 10 via a communication network 931 (FIG. 17).

The storage unit 350 is a recording medium that stores programs to be executed by the control unit 310 and stores data necessary for the execution of the programs. In addition, the storage unit 350 transitorily stores data to perform computation by the control unit 310. The storage unit 350 may be a magnetic storage device, a semiconductor storage device, an optical storage device, or a magneto-optical storage device.

The functional configuration example of the anonymous information server 30 according to the embodiment of the present disclosure has been described above.

1.4. Overall Functions

Next, overall functions of the information processing system 1 according to the embodiment of the present disclosure will be described. First, processing of switching an anonym ID associated with position information will be described as an example in which association of an anonym ID with the position information is contrived.

Figure 5:
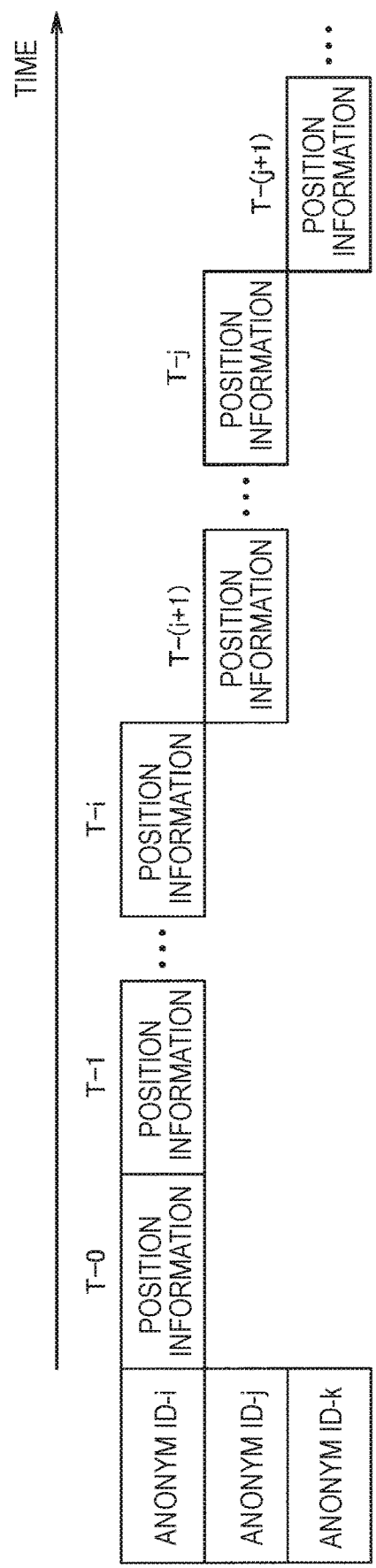
FIG. 5 is a diagram for explaining processing of switching anonym IDs associated with position information.

FIG. 5 is a diagram for explaining the processing of switching the anonym ID associated with the position information. As described above with reference to FIG. 1, user's position information is stored in the storage unit 350 in the anonymous information server 30. The position information of the user may change in a time series manner. As illustrated in FIG. 5, a case in which the user's position information at each time from a time T-0 to a time T-(j+1) is transmitted from the information processing device 10 to the anonymous information server 30 in the anonymous information server 30 and is stored in the storage unit 350 in the anonymous information server 30 is assumed.

In such a case, the processing execution unit 313 performs processing of switching an anonym ID associated with the position information at a predetermined timing in the anonymous information server 30. The timing at which the anonym ID is switched will be described later. In the example illustrated in FIG. 5, the processing execution unit 313 performs switching between an anonym ID-i associated with the position information at a time T-i and an anonym ID-j associated with the position information at a time T-(i+1). Also, the processing execution unit 313 performs switching between the anonym ID-j associated with the position information at a time T-j and an anonym ID-k associated with the position information at a time T-(j+1).

Figure 6:
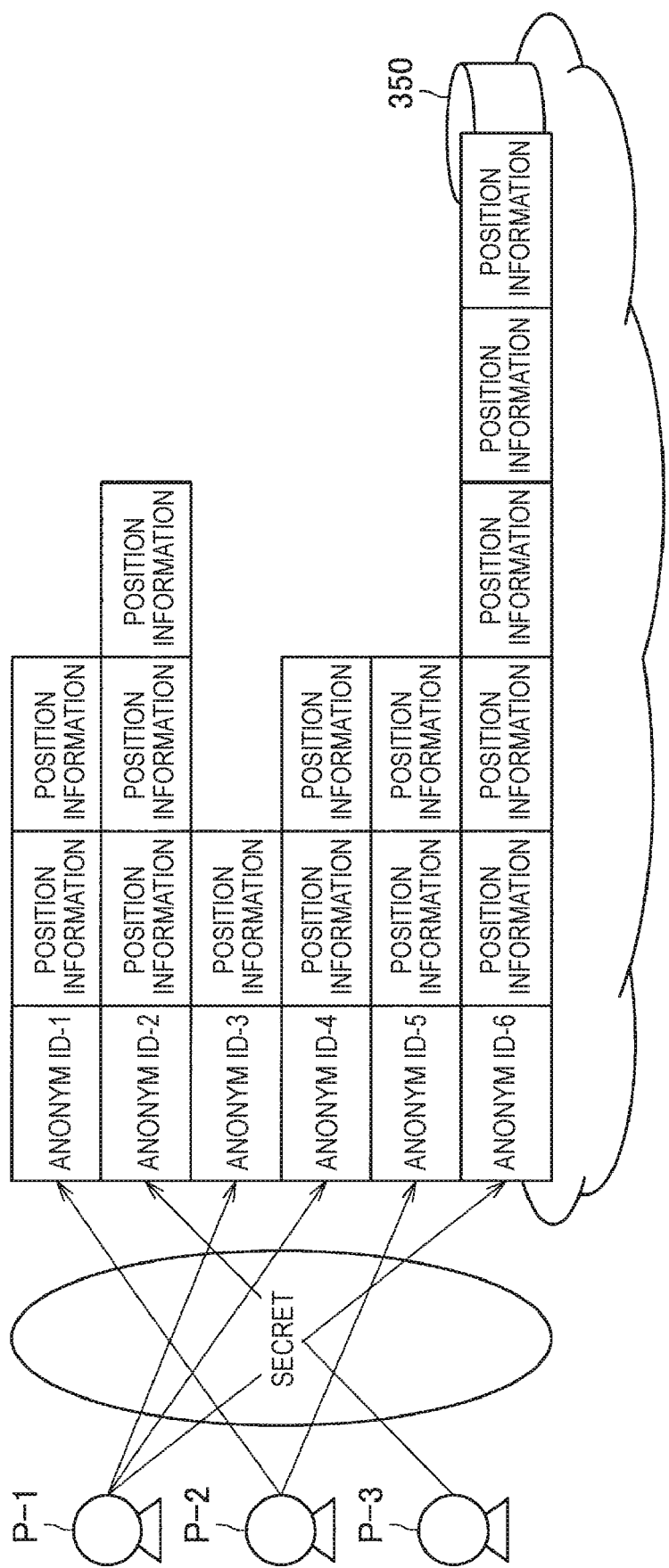
FIG. 6 is an example illustrating association between the position information and the anonym IDs for the respective users.

FIG. 6 is an example illustrating association between position information and anonym IDs for the respective users. As described above, the anonym IDs associated with a plurality of pieces of user's position information per person may be one anonym ID or a plurality of types of anonym IDs through the processing of switching the anonym ID associated with the position information. Specifically, referring to FIG. 6, an anonym ID-3 is associated with one piece of position information of a user P-1, an anonym ID-4 is associated with two pieces of position information of the user P-1, and an anonym ID-6 is associated with the five pieces of position information of the user P-1.

In addition, an anonym ID-1 is associated with two pieces of position information of a user P-2, and an anonym ID-5 is associated with two pieces of position information of the user P-2. Also, an anonym ID-2 is associated with three pieces of position information of a user P-3. In this manner, the risks that individuals may be identified from histories (action histories) of position information over a long period of time is reduced through the processing of switching the anonym IDs associated with the position information. That is, a probability at which the position information associated with each of the users P-1 to P-3 will be recognized by a third person is reduced (confidentiality of the position information is enhanced) through the processing of switching the anonym IDs.

Figure 7:
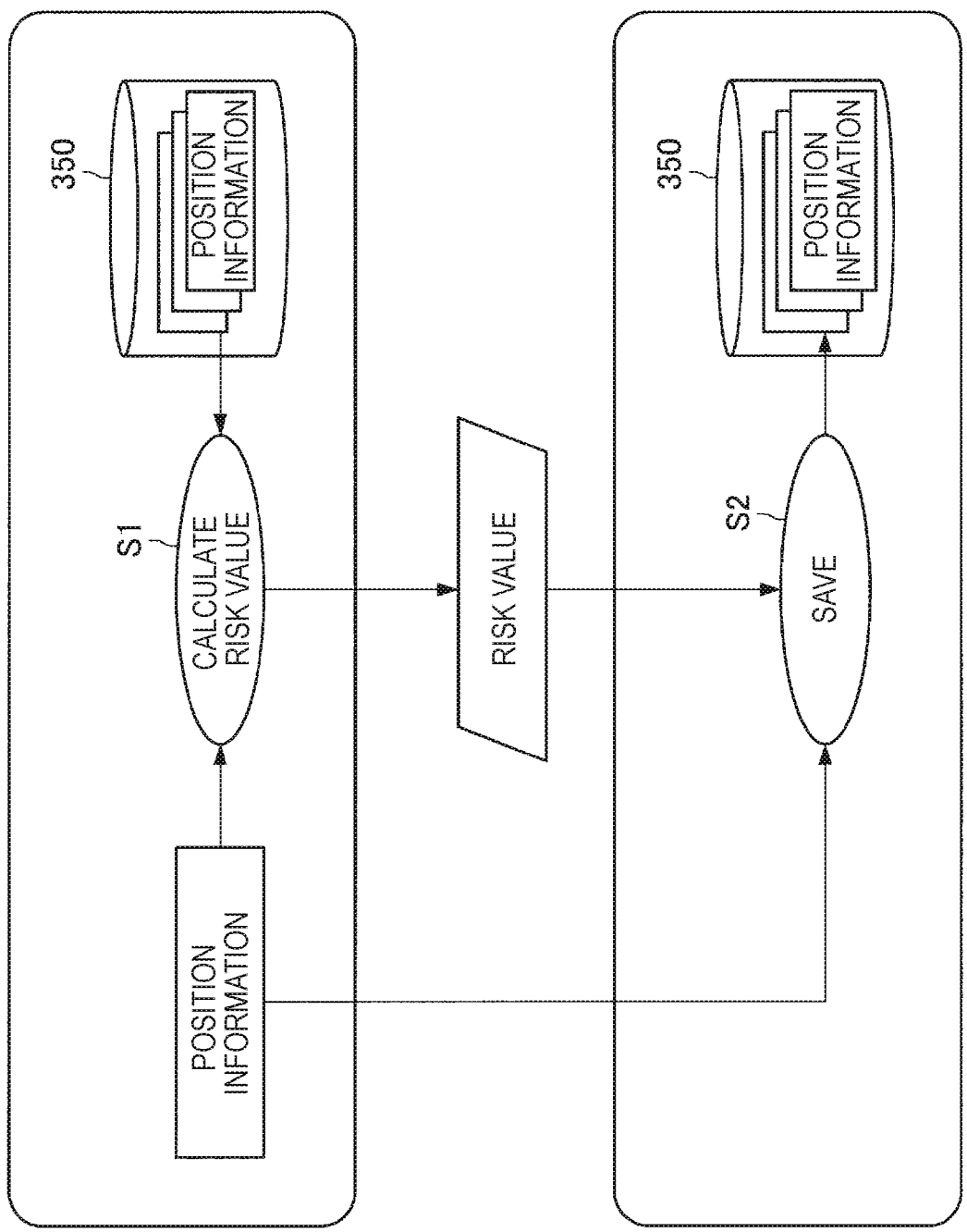
FIG. 7 is a diagram for explaining an example of a timing at which the anonym IDs are switched.

Next, an example of a timing at which the anonym ID is switched will be described. FIG. 7 is a diagram for explaining an example of a timing at which the anonym ID is switched. As illustrated in FIG. 7, the storage unit 350 in the anonymous information server 30 stores a plurality of pieces of position information received from the information processing device 10. Then, the data acquisition unit 311 in the anonymous information server 30 newly acquires position information from the information processing device 10 via the communication unit 340. Also, the data acquisition unit 311 acquires a plurality of pieces of position information stored in the storage unit 350.

Next, the risk value acquisition unit 312 calculates a risk value in a case in which the position information newly acquired by the data acquisition unit 311 leaks (S1). Specifically, the risk value acquisition unit 312 calculates a probability at which a user associated with the new position information will be identified by a third person in a case in which the new position information acquired by the data acquisition unit 311 and a current anonym ID leak in an associated state after the new position information is associated with the anonym ID and saved in an associated manner (alternatively, in a case in which a plurality of pieces of position information acquired from the storage unit 350 also leaks in the state in which the plurality of pieces of position information are associated with the anonym ID in addition to the new position information). For example, such a risk value may be calculated (acquired) on the basis of at least any of the position information or information related to the position information.

In a case in which position information exists inside a first predetermined area, for example, the risk value may be calculated to be higher than that in a case in which position information is located outside the first predetermined area. For example, the first predetermined area may be an area in which a degree of influences on user's privacy is high (for example, inside home, in the neighbor of home, or the like). Meanwhile, in a case in which position information exists in a second predetermined area, the risk value may be calculated to be lower than that in a case in which the position information exists outside the second predetermined area. The second predetermined area may be an area in which the degree of influences on user's privacy is low (for example, in a park, in the neighbor of a park, or the like).

As a specific example, a case in which an application for managing user's running (hereinafter, also referred to as a "running application") is used is assumed. In such a case, the risk value is calculated to be high immediately after the user starts to run since the use exists inside home, in the neighbor of the home, or the like. Meanwhile, the risk value is calculated to be low when the user is running around a running course in a park.

Also, the risk value may be a risk value in a case in which new position information is stored in association with a plurality of pieces of position information stored in the storage unit 350. It is assumed that the degree of influences of the position information on user's privacy is higher in a case in which an elapse time from a start of position measurement exceeds a predetermined time than in a case in which the elapse time from the start of position measurement is less than the predetermined time. Thus, the risk value may be calculated to be higher than that in the case in which the elapse time from the start of position measurement is less than the predetermined time.

As a specific example, a case in which an application for recording user's daily exercise data (hereinafter, also referred to as a "life log application") is used is assumed. In such a case, user's position information is recorded at specific time intervals (for example, every two minutes). At this time, the risk value may be calculated to be higher in a case in which an elapse time from a start of position measurement exceeds a predetermined time (for example, 24 hours or the like) than in a case in which the elapse time from the start of position measurement is less than the predetermined time.

The processing execution unit 313 associates an anonym ID with new position information. At this time, the processing execution unit 313 sets the anonym ID associated with the new position information to be the same as an anonym ID associated with previously received position information (the anonym ID associated with the new position information is not switched) in a case in which the risk value does not exceed a predetermined threshold value. Meanwhile, in a case in which the risk value exceeds the threshold value, the processing execution unit 313 differentiate the anonym ID associated with the new position information from the anonym ID associated with the previously received position information (the anonym ID associated with the new position information is switched). The processing execution unit 313 saves the new position information and the anonym ID (causes the new position information and the anonym ID to be stored) in the storage unit 350 in an associated state (S2).

Figure 8:
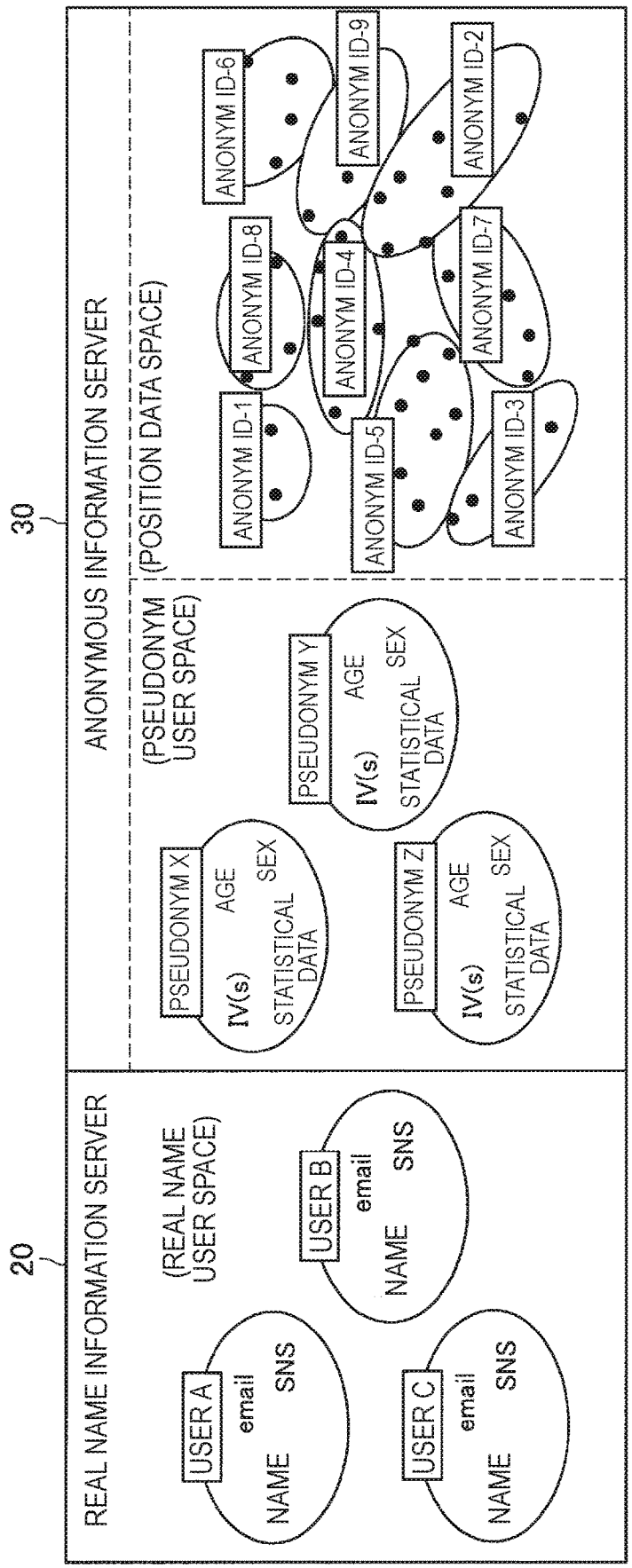
FIG. 8 is a diagram illustrating an example of information stored in each of the real name information server and the anonymous information server.

Next, an example of information stored in each of the real name information server 20 and the anonymous information server 30 will be described. FIG. 8 is a diagram illustrating an example of information stored in each of the real name information server 20 and the anonymous information server 30. As illustrated in FIG. 8, the real name information server 20 has a space for storing information regarding real name users (hereinafter, also referred to as a "real name user space"). The real name user space stores user IDs and users' individual information as an example of the users' real name information in an associated state.

FIG. 8 illustrates a "user A", a "user B", and a "user C" as examples of user IDs. However, the number of user IDs is not limited to three and may be any number. Also, FIG. 8 illustrates, as the users' individual information, users' names (real names), email addresses, and social networking service (SNS) accounts. However, the users' individual information is not limited thereto.

Also, as illustrated in FIG. 8, the anonymous information server 30 has a space for storing information regarding pseudonym users (hereinafter, also referred to as a "pseudonym user space"). Note that there is a case in which users to which user IDs are applied may be referred to as real name users, and IDs of a different type from the user IDs applied to the real name users (hereinafter, also referred to as "pseudonym IDs) may be referred to as pseudonym users below in some cases. The pseudonym user space stores pseudonym IDs and attributes of the pseudonym users in an associated state.

FIG. 8 illustrates a "pseudonym X", a "pseudonym Y", and a "pseudonym Z" as examples of the pseudonym IDs. Also, FIG. 8 illustrates initialization vectors (hereinafter, also referred to as "IVs") as an example of an age, a sex, statistical data, and identification data of the pseudonym users as attributes of the pseudonym users. As in these examples, the attributes of the pseudonym users may be information with which it is more difficult to identify associated users as compared with the anonymous information such as position information. The attributes of the pseudonym users are not limited thereto. Note that (s) in IV(s) indicates that there are a plurality of IVs.

Also, as illustrated in FIG. 8, the anonymous information server 30 has a space for storing position information as an example of the users' anonymous information (hereinafter, referred to as a "position data space"). The position data space stores the users' position information and the anonym IDs in an associated state. FIG. 8 illustrates an "anonym ID-1" to an "anonym ID-9" as examples of the anonym IDs. However, the number of anonym IDs is not limited to nine and may be any number. Also, FIG. 8 illustrates a plurality of pieces of position information related to the anonym IDs using dots.

Figure 9:
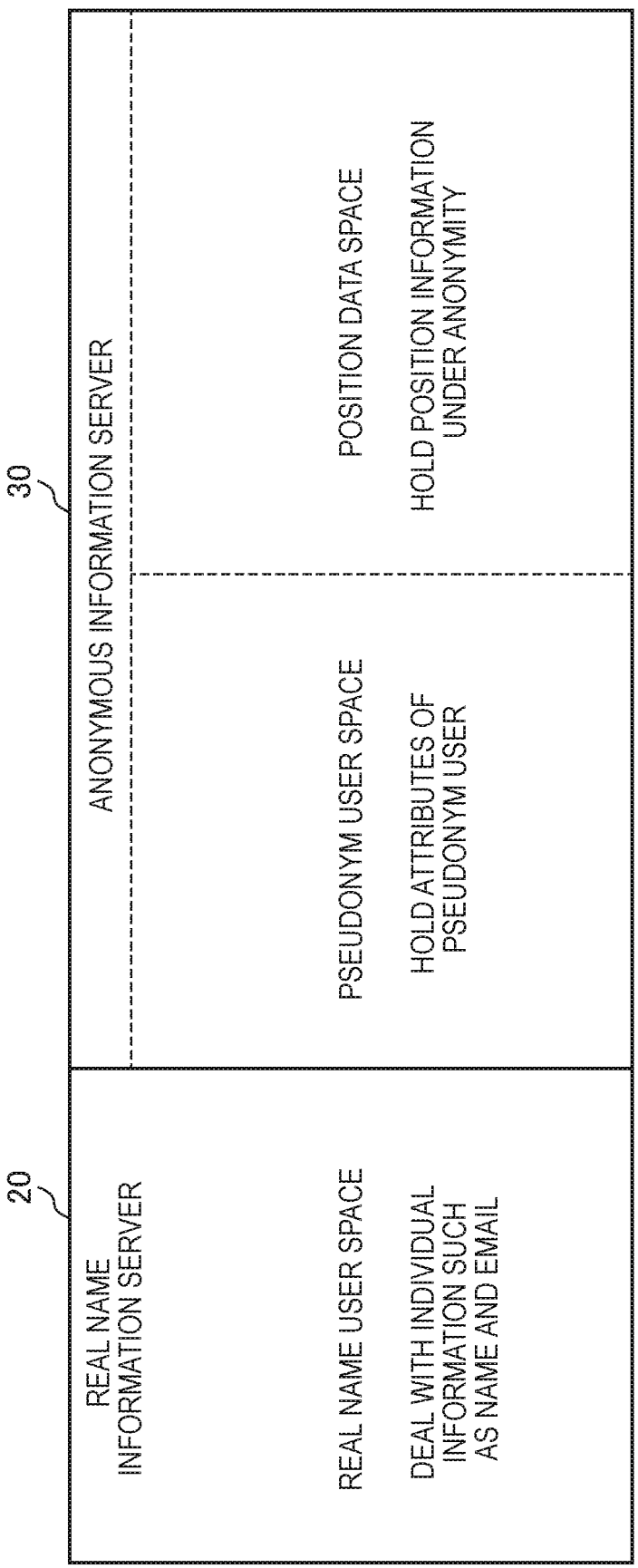
FIG. 9 is a diagram for explaining an outline of information stored in each of the real name information server and the anonymous information server.

FIG. 9 is a diagram for explaining an outline of information stored in each of the real name information server 20 and the anonymous information server 30. As illustrated in FIG. 9, the real name information server 20 has a real name user space, and the real name user space is for dealing with individual information such as users' names and emails. Meanwhile, the anonymous information server 30 has a pseudonym user space, and the pseudonym user space holds attributes of the pseudonym users. Also, the anonymous information server 30 has a position data space, and the position data space holds position information under anonymity. Note that the anonymous information server 30 may have confidential data space instead of the position data space. Examples of the confidential data are as described above.

Figure 10:
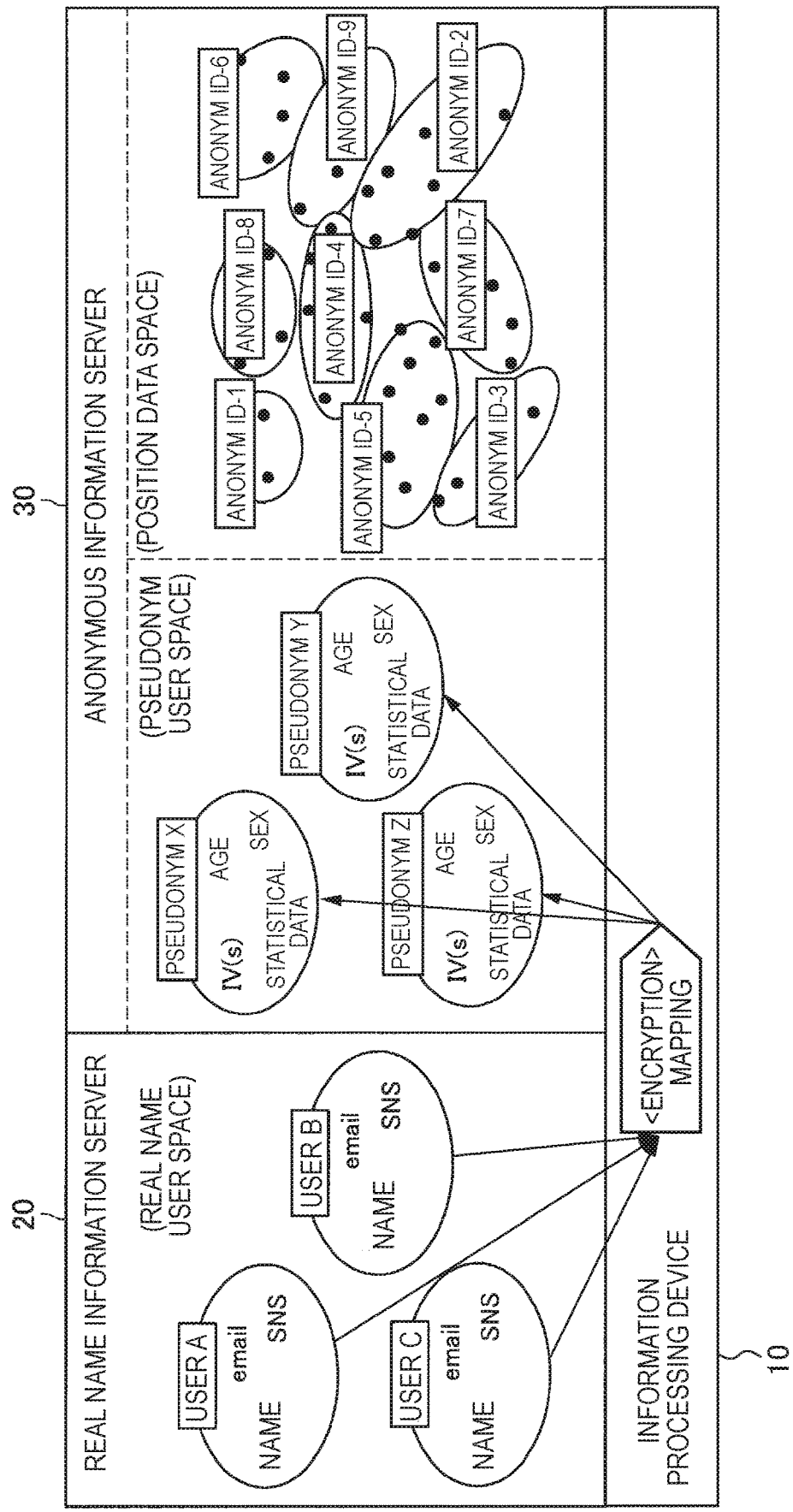
FIG. 10 is a diagram illustrating an example of mapping of user IDs and pseudonym IDs.

Next, an example of mapping in the information processing device 10 will be described. FIG. 10 is a diagram illustrating an example of mapping of user IDs and pseudonym IDs. As illustrated in FIG. 10, the user IDs and the pseudonym IDs are applied to the same users. In the example illustrated in FIG. 10, a user ID "user A" and a pseudonym ID "pseudonym X" are applied to the same user (the user P-1 illustrated in FIG. 6), and the user ID "user A" and the pseudonym ID "pseudonym X" are mapped in the information processing device 10.

Similarly, a user ID "user B" and a pseudonym ID "pseudonym Y" are applied to the same user (the user P-2 illustrated in FIG. 6), and the user ID "user B" and the pseudonym ID "pseudonym Y" are mapped in the information processing device 10. Also, a user ID "user C" and a pseudonym ID "pseudonym Z" are applied to the same user (the user P-3 illustrated in FIG. 6), and the user ID "user C" and the pseudonym ID "pseudonym Z" are mapped in the information processing device 10.

Figure 11:
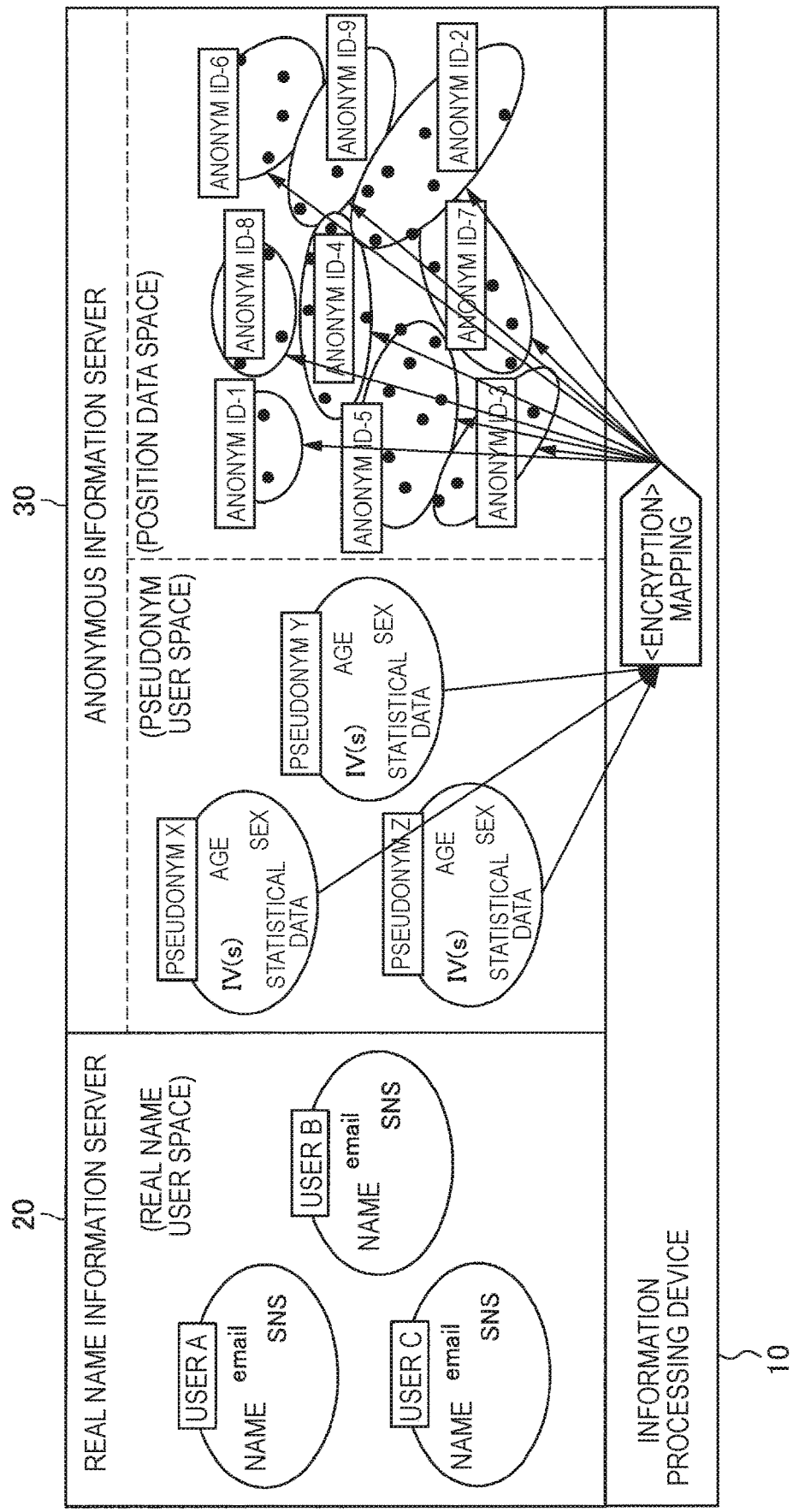
FIG. 11 is a diagram illustrating an example of mapping of pseudonym IDs and anonym IDs.

FIG. 11 is a diagram illustrating an example of mapping of pseudonym IDs and anonym IDs. As illustrated in FIG. 11, one or a plurality of anonym IDs are associated with the pseudonym IDs. In the example illustrated in FIG. 11, the pseudonym ID "pseudonym X" and a plurality of anonym IDs (for example, the anonym ID-1, the anonym ID-2, and the anonym ID-3) are associated with each other, and the pseudonym ID "pseudonym X" and a plurality of anonym IDs (for example, the anonym ID-1, the anonym ID-2, and the anonym ID-3) are mapped in the information processing device 10.

Similarly, the pseudonym ID "pseudonym Y" and a plurality of anonym IDs (for example, the anonym ID-4, the anonym ID-5, and the anonym ID-6) are associated with each other, and the pseudonym ID "pseudonym Y" and the plurality of anonym IDs (for example, the anonym ID-4, the anonym ID-5, and the anonym ID-6) are mapped in the information processing device 10. Also, the pseudonym ID "pseudonym Z" and a plurality of anonym IDs (for example, an anonym ID-7, an anonym ID-8, and an anonym ID-9) are associated with each other, and the pseudonym ID "pseudonym Y" and the plurality of anonym IDs (for example, the anonym ID-7, the anonym ID-8, and the anonym ID-9) are mapped in the information processing device 10.

Figure 12:
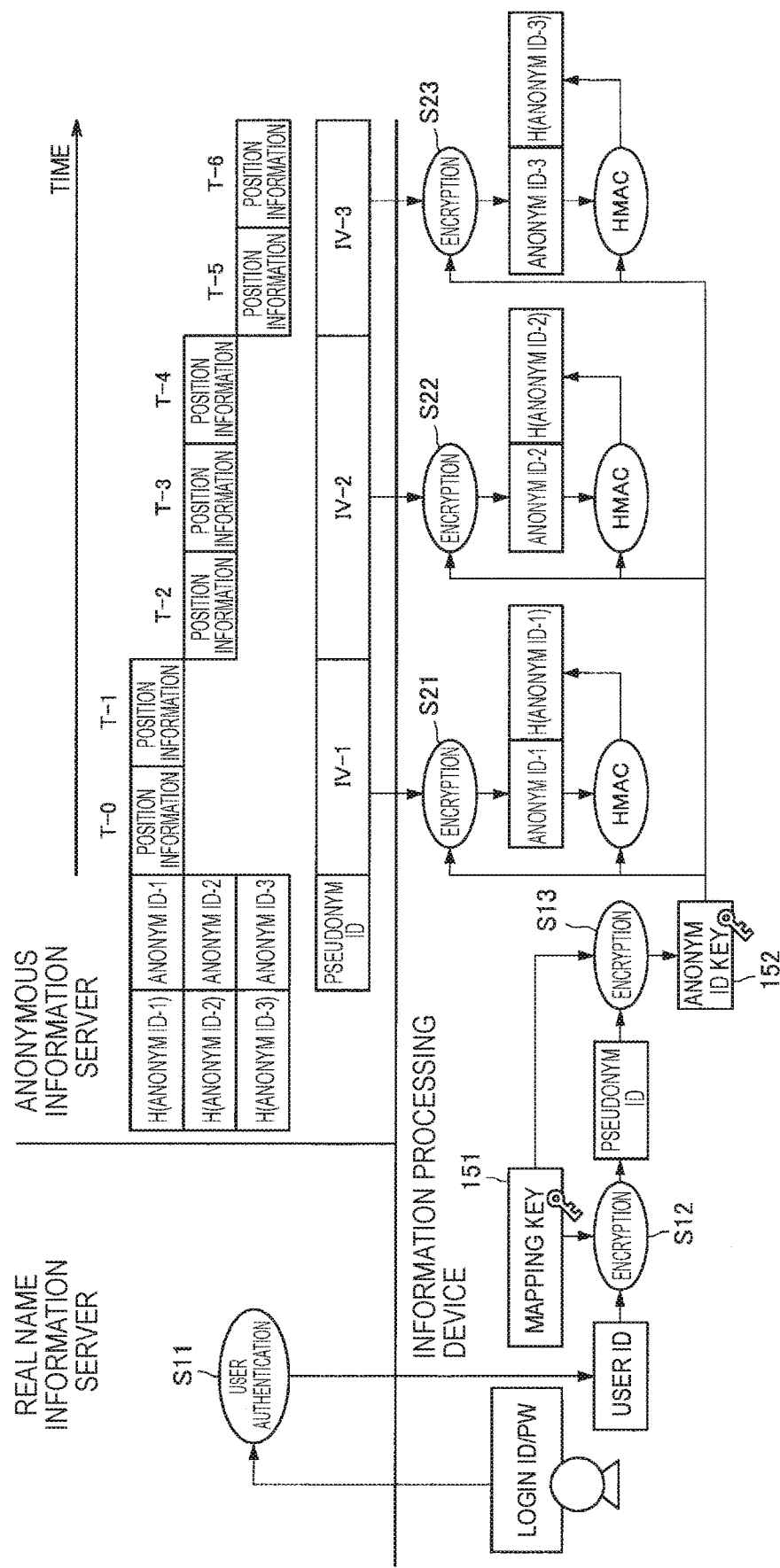
FIG. 12 is a diagram for explaining details of processing of switching anonym IDs.

Next, the processing of switching the anonym ID will be described in detail. FIG. 12 is a diagram for explaining details of the processing of switching the anonym ID. As illustrated in FIG. 12, a user inputs a login ID and a password to a predetermined site provided by the real name information server 20 in the information processing device 10. If the login ID and the password are received by the input unit 130, then the communication unit 140 transmits the login ID and the password to the real name information server 20.

If the communication unit 240 receives the login ID and the password, user authentication is performed by determining whether or not the login ID and the password coincide with data registered in advance using the control unit 210 in the real name information server 20 (S11). The communication unit 240 transmits a user ID registered in advance corresponding to the login ID and the password to the information processing device 10 in a case in which the user has successfully been authenticated. Note that although a case in which the user ID is transmitted from the real name information server 20 is mainly described here, the user ID may be input by the user himself/herself.

Then, the acquisition unit 111 acquires the user ID via the communication unit 140 in the information processing device 10. Then, the anonym ID generation unit 112 obtains a pseudonym ID associated with the user ID. For example, the anonym ID generation unit 112 obtains encrypted data that can be obtained by performing encryption using a mapping key 151 prepared in advance for the user ID as a pseudonym ID associated with the user ID (S12). The communication unit 140 transmits the pseudonym ID to the anonymous information server 30.

If the data acquisition unit 311 acquires the pseudonym ID via the communication unit 340, the processing execution unit 313 associates IV-1 (first identification data) with the pseudonym ID in the anonymous information server 30. Then, the communication unit 340 transmits IV-1 to the information processing device 10. In the information processing device 10, the anonym ID generation unit 112 acquires IV-1 via the communication unit 140.

The anonym ID generation unit 112 generates an anonym ID-1 (first anonym ID) in accordance with IV-1. Here, the anonym ID-1 may be generated in any way. In one example, the anonym ID generation unit 112 obtains an anonym ID key 152 associated with the pseudonym ID. Specifically, the anonym ID generation unit 112 obtains the encrypted data obtained by encrypting the pseudonym ID using the mapping key 151 as an anonym ID key 152 associated with the pseudonym ID (S13). Then, the anonym ID generation unit 112 generates encrypted data obtained by encrypting IV-1 using the anonym ID key 152 as the anonym ID-1 in accordance with IV-1 (S21).

The anonym ID provision unit 113 provides the position information at the time T-0 and the anonym ID-1 to the anonymous information server 30 via the communication unit 140. Here, a case in which a hash-based message authentication code (HMAC) is generated by the anonym ID provision unit 113 on the basis of the anonym ID-1, the anonym ID key 152, and a hush function and the HMAC is provided as the anonym ID-1 to the anonymous information server 30 will be mainly assumed. However, it is not essential to generate the HMAC.

In the anonymous information server 30, the data acquisition unit 311 acquires the position information at the time T-0 and the anonym ID-1 via the communication unit 340. Then, the processing execution unit 313 saves the position information at the time T-0 and the anonym ID-1 (causes the position information and the anonym ID-1 to be stored) in the storage unit 350 in an associated state. Note that since the position information at the time T-0 is position information that is acquired by the anonymous information server 30 for the first time, the risk value in a case in which the position information at the time T-0 leaks may not be calculated in particular.

Then, the anonym ID provision unit 113 provides position information at the time T-1 (first anonymous information) and the anonym ID-1 (first anonym ID) to the anonymous information server 30 via the communication unit 140. In the anonymous information server 30, the data acquisition unit 311 acquires the position information at the time T-1 and the anonym ID-1 via the communication unit 340.

Here, the risk value acquisition unit 312 calculates a risk value in a case in which the position information at the time T-1 leaks. In a case in which the risk value does not exceed a threshold value, the processing execution unit 313 associates the anonym ID-1 with the position information at the time T-1 without performing the processing of switching the anonym ID. Here, a case in which the anonym ID-1 that is the same as the anonym ID-1 associated with the position information at the time T-0 is associated with the position information at the time T-1 since the risk value does not exceed the threshold value is assumed.

Then, the anonym ID provision unit 113 provides position information at the time T-2 (second anonymous information) and the anonym ID-2 (second anonym ID) to the anonymous information server 30 via the communication unit 140. In the anonymous information server 30, the data acquisition unit 311 acquires the position information at the time T-2 and the anonym ID-2 via the communication unit 340.

Here, the risk value acquisition unit 312 calculates a risk value in a case in which position information at the time T-2 leaks. The processing execution unit 313 performs the processing of switching the anonym ID and associates anonym ID-2 that is different from the anonym ID-1 with the position information at the time T-2 in a case in which the risk value exceeds the threshold value. Here, a case in which the risk value exceeds the threshold value is assumed.

At this time, the processing execution unit 313 provides an anonym ID regeneration request to the information processing device 10 via the communication unit 340. In the information processing device 10, if the acquisition unit 111 acquires the anonym ID regeneration request via the communication unit 140, the anonym ID generation unit 112 provides a new IV generation request to the anonymous information server 30 via the communication unit 140.

If the data acquisition unit 311 acquires the new IV generation request via the communication unit 340, the processing execution unit 313 associates IV-2 (second identification data) different from IV-1 with the pseudonym ID in the anonymous information server 30. Then, the communication unit 340 transmits IV-2 to the information processing device 10. In the information processing device 10, the anonym ID generation unit 112 acquires IV-2 via the communication unit 140.

The anonym ID generation unit 112 generates an anonym ID-2 (second anonym ID) in accordance with IV-2 (S22). Here, the anonym ID-2 may be generated similarly to the anonym ID-1. The anonym ID provision unit 113 provides the position information at the time T-2 and the anonym ID-2 to the anonymous information server 30 via the communication unit 140. In the anonymous information server 30, the data acquisition unit 311 acquires the position information at the time T-2 and the anonym ID-2 via the communication unit 340. Then, the processing execution unit 313 saves the position information at the time T-2 and the anonym ID-2 (causes the position information and the anonym ID-2 to be stored) in the storage unit 350 in an associated state.

Then, the anonym ID provision unit 113 provides position information at the time T-3 and the anonym ID-2 to the anonymous information server 30 via the communication unit 140. In the anonymous information server 30, the data acquisition unit 311 acquires the position information at the time T-3 and the anonym ID-2 via the communication unit 340.

Here, the risk value acquisition unit 312 calculates a risk value in a case in which the position information at the time T-3 leaks. In a case in which the risk value does not exceed a threshold value, the processing execution unit 313 associates the anonym ID-2 with the position information at the time T-3 without performing the processing of switching the anonym ID. Here, a case in which the anonym ID-2 that is the same as the anonym ID-2 associated with the position information at the time T-2 is associated with the position information at the time T-3 since the risk value does not exceed the threshold value is assumed.

Then, the anonym ID provision unit 113 provides position information at the time T-4 and the anonym ID-2 to the anonymous information server 30 via the communication unit 140. In the anonymous information server 30, the data acquisition unit 311 acquires the position information at the time T-4 and the anonym ID-2 via the communication unit 340.

Here, the risk value acquisition unit 312 calculates a risk value in a case in which the position information at the time T-4 leaks. In a case in which the risk value does not exceed a threshold value, the processing execution unit 313 associates the anonym ID-2 with the position information at the time T-4 without performing the processing of switching the anonym ID. Here, a case in which the anonym ID-2 that is the same as the anonym ID-2 associated with the position information at the time T-3 is associated with the position information at the time T-4 since the risk value does not exceed the threshold value is assumed.

Then, the anonym ID provision unit 113 provides position information at the time T-5 and the anonym ID-2 to the anonymous information server 30 via the communication unit 140. In the anonymous information server 30, the data acquisition unit 311 acquires the position information at the time T-5 and the anonym ID-2 via the communication unit 340.

Here, the risk value acquisition unit 312 calculates a risk value in a case in which position information at the time T-5 leaks. The processing execution unit 313 performs the processing of switching the anonym ID and associates anonym ID-3 that is different from the anonym ID-2 with the position information at the time T-5 in a case in which the risk value exceeds the threshold value. Here, a case in which the risk value exceeds the threshold value is assumed.

At this time, an anonym ID-3 is generated similarly to the anonym ID-1 (S23). The anonym ID provision unit 113 provides the position information at the time T-5 and the anonym ID-3 to the anonymous information server 30 via the communication unit 140. In the anonymous information server 30, the data acquisition unit 311 acquires the position information at the time T-5 and the anonym ID-3 via the communication unit 340. Then, the processing execution unit 313 saves the position information at the time T-5 and the anonym ID-3 (causes the position information and the anonym ID-3 to be stored) in the storage unit 350 in an associated state.

Then, the anonym ID provision unit 113 provides position information at the time T-6 and the anonym ID-3 to the anonymous information server 30 via the communication unit 140. In the anonymous information server 30, the data acquisition unit 311 acquires the position information at the time T-6 and the anonym ID-3 via the communication unit 340.

Here, the risk value acquisition unit 312 calculates a risk value in a case in which the position information at the time T-6 leaks. In a case in which the risk value does not exceed a threshold value, the processing execution unit 313 associates the anonym ID-3 with the position information at the time T-6 without performing the processing of switching the anonym ID. Here, a case in which the anonym ID-3 that is the same as the anonym ID-3 associated with the position information at the time T-5 is associated with the position information at the time T-6 since the risk value does not exceed the threshold value is assumed.

In this manner, the anonym IDs are associated with the position information at each of the time T-1 to the time T-6. In particular, FIG. 12 illustrates an example in which the processing of switching the anonym ID is performed at the time T-2 and at the time T-5. However, the timing at which the processing of switching the anonym ID is not limited to these examples. Also, anonym IDs are associated with the position information at and after the time T-7 in a similar manner.

The overall functions of the information processing system 1 according to the embodiment of the present disclosure have been described above.

1.5. Operation Examples

Figure 13:
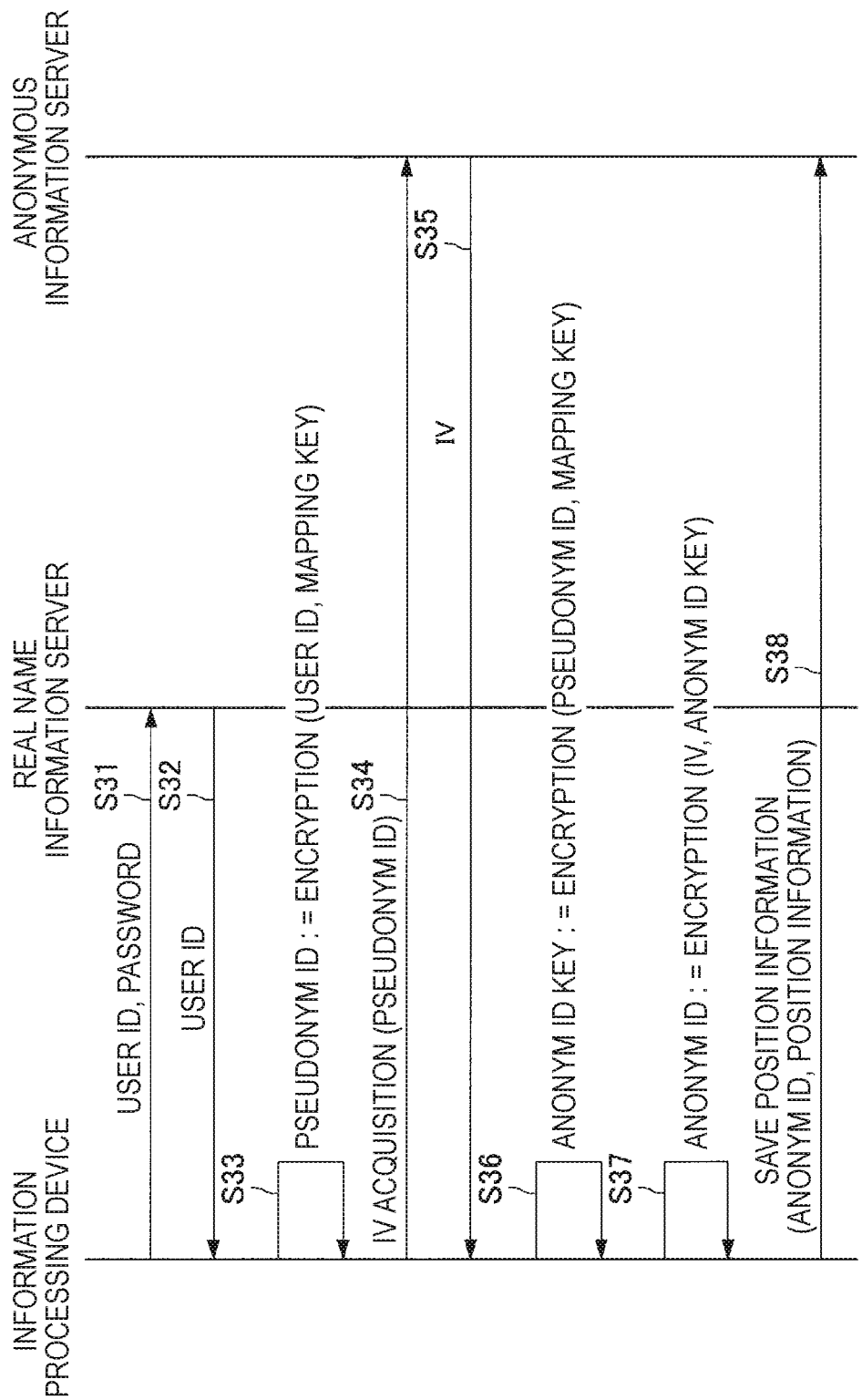
FIG. 13 is a flowchart illustrating an operation example from user authentication to saving of position information (in a case in which anonym IDs are not switched).

Next, an operation example of the information processing system 1 according to the embodiment of the present disclosure will be described. FIG. 13 is a flowchart illustrating an operation example (in which switching of the anonym ID is not performed) from user authentication to saving of the position information. Note that the flowchart illustrated in FIG. 13 illustrates only an example of operations from user authentication to saving of the position information. Therefore, operations from user authentication to saving of the position information are not limited to the operation example in the flowchart illustrated in FIG. 13.

A user inputs a login ID and a password to a predetermined site provided by the real name information server 20 in the information processing device 10. If the login ID and the password are received by the input unit 130, then the communication unit 140 transmits the login ID and the password to the real name information server 20 (S31).

If the communication unit 240 receives the login ID and the password, user authentication is performed by determining whether or not the login ID and the password coincide with data registered in advance using the control unit 210 in the real name information server 20. The communication unit 240 transmits a user ID registered in advance corresponding to the login ID and the password to the information processing device 10 in a case in which the user has successfully been authenticated (S32).

Then, the acquisition unit 111 acquires the user ID via the communication unit 140 in the information processing device 10. Then, the anonym ID generation unit 112 obtains encrypted data that can be obtained by performing encryption using a mapping key 151 prepared in advance for the user ID as a pseudonym ID associated with the user ID (S33). The communication unit 140 transmits the pseudonym ID to the anonymous information server 30 (S34).

If the data acquisition unit 311 acquires the pseudonym ID via the communication unit 340, the processing execution unit 313 associates IV with the pseudonym ID in the anonymous information server 30. Then, the communication unit 340 transmits IV to the information processing device 10 (S35). In the information processing device 10, the acquisition unit 111 acquires IV via the communication unit 140.

The anonym ID generation unit 112 obtains the encrypted data obtained by encrypting the pseudonym ID using the mapping key 151 as an anonym ID key 152 associated with the pseudonym ID (S36). Then, the anonym ID generation unit 112 generates encrypted data obtained by encrypting IV using the anonym ID key 152 as the anonym ID in accordance with IV (S37).

The anonym ID provision unit 113 provides the position information and the anonym ID to the anonymous information server 30 via the communication unit 140 (S38). In the anonymous information server 30, the data acquisition unit 311 acquires the position information and the anonym ID via the communication unit 340.

Here, the risk value acquisition unit 312 acquires the risk value in a case in which the position information leaks. The processing execution unit 313 does not perform the processing of switching the anonym ID in a case in which the risk value does not exceed a threshold value (max). Here, a case in which the risk value does not exceed the threshold value is assumed. At this time, the processing execution unit 313 saves the position information and the anonym ID (causes the position information and the anonym ID to be stored) in the storage unit 350 in an associated state.

Figure 14:
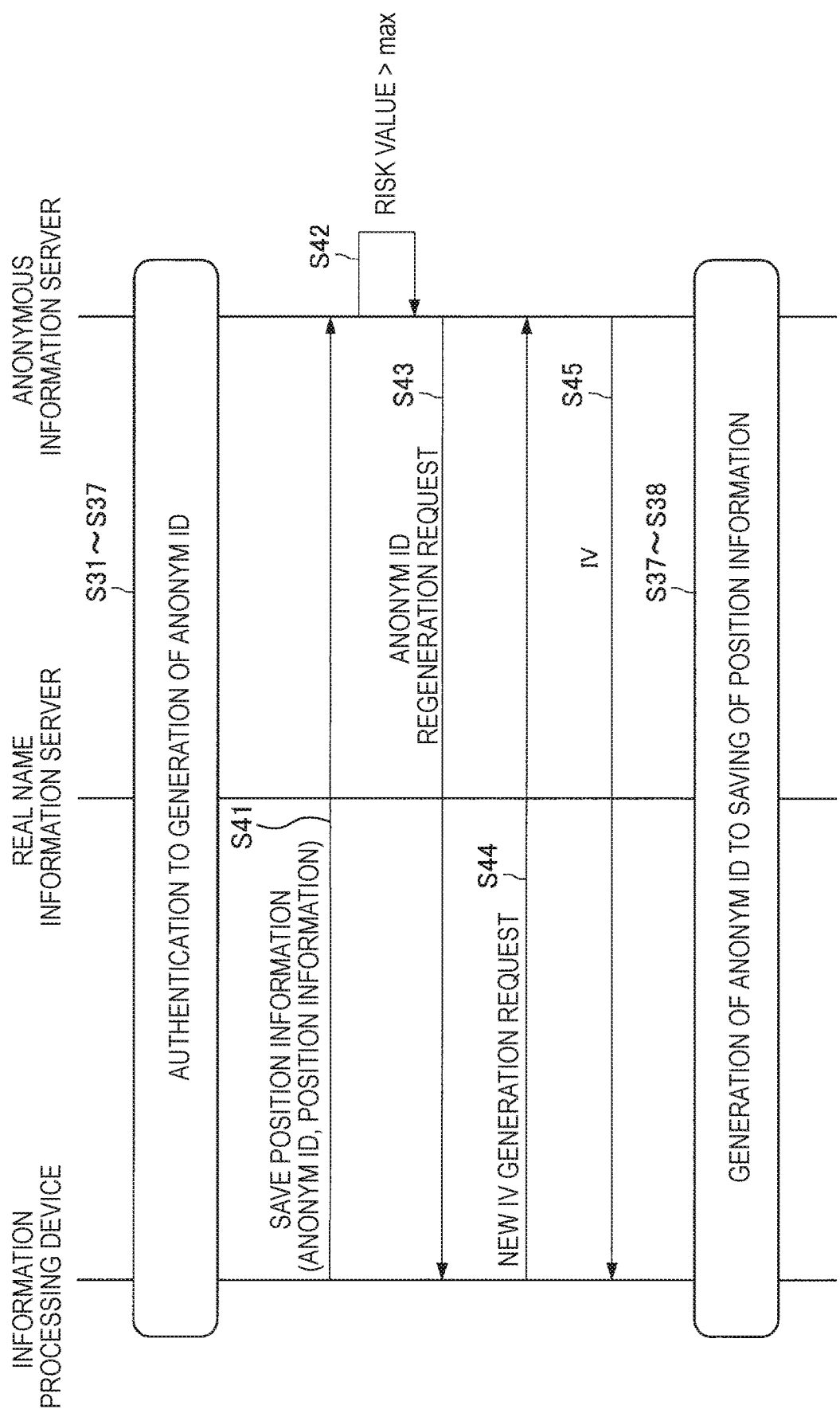
FIG. 14 is a flowchart illustrating an operation example from user authentication to saving of position information (in a case in which anonym IDs are switched).

FIG. 14 is a flowchart illustrating an operation example (in which switching of the anonym ID is performed) from user authentication to saving of the position information. Note that the flowchart illustrated in FIG. 14 illustrates only an example of operations from user authentication to saving of the position information. Therefore, operations from user authentication to saving of the position information are not limited to the operation example in the flowchart illustrated in FIG. 14.

First, operations from the user authentication to the generation of the anonym ID are performed as described above with reference to FIG. 13 (S31 to S37). Next, the anonym ID provision unit 113 provides the position information and the anonym ID to the anonymous information server 30 via the communication unit 140 (S41). In the anonymous information server 30, the data acquisition unit 311 acquires the position information and the anonym ID via the communication unit 340.

Here, the risk value acquisition unit 312 acquires the risk value in a case in which the position information leaks. The processing execution unit 313 performs processing of switching the anonym ID in a case in which the risk value exceeds the threshold value (max) (S42). Here, a case in which the risk value exceeds the threshold value is assumed.

At this time, the processing execution unit 313 provides an anonym ID regeneration request to the information processing device 10 via the communication unit 340 (S43). In the information processing device 10, if the acquisition unit 111 acquires the anonym ID regeneration request via the communication unit 140, the anonym ID generation unit 112 provides a new IV generation request to the anonymous information server 30 via the communication unit 140 (S44).

If the new IV generation request is acquired by the data acquisition unit 311 via the communication unit 340 in the anonymous information server 30, the processing execution unit 313 switches IV associated with the pseudonym ID. Then, IV after the switching is transmitted to the information processing device 10 by the communication unit 340 (S45). In the information processing device 10, IV after the switching is acquired by the acquisition unit 111 via the communication unit 140. The operations from the generation of the anonym ID in accordance with IV after the switching to the saving of the position information are executed as described above with reference to FIG. 13 (S37 to S38).

Figure 15:
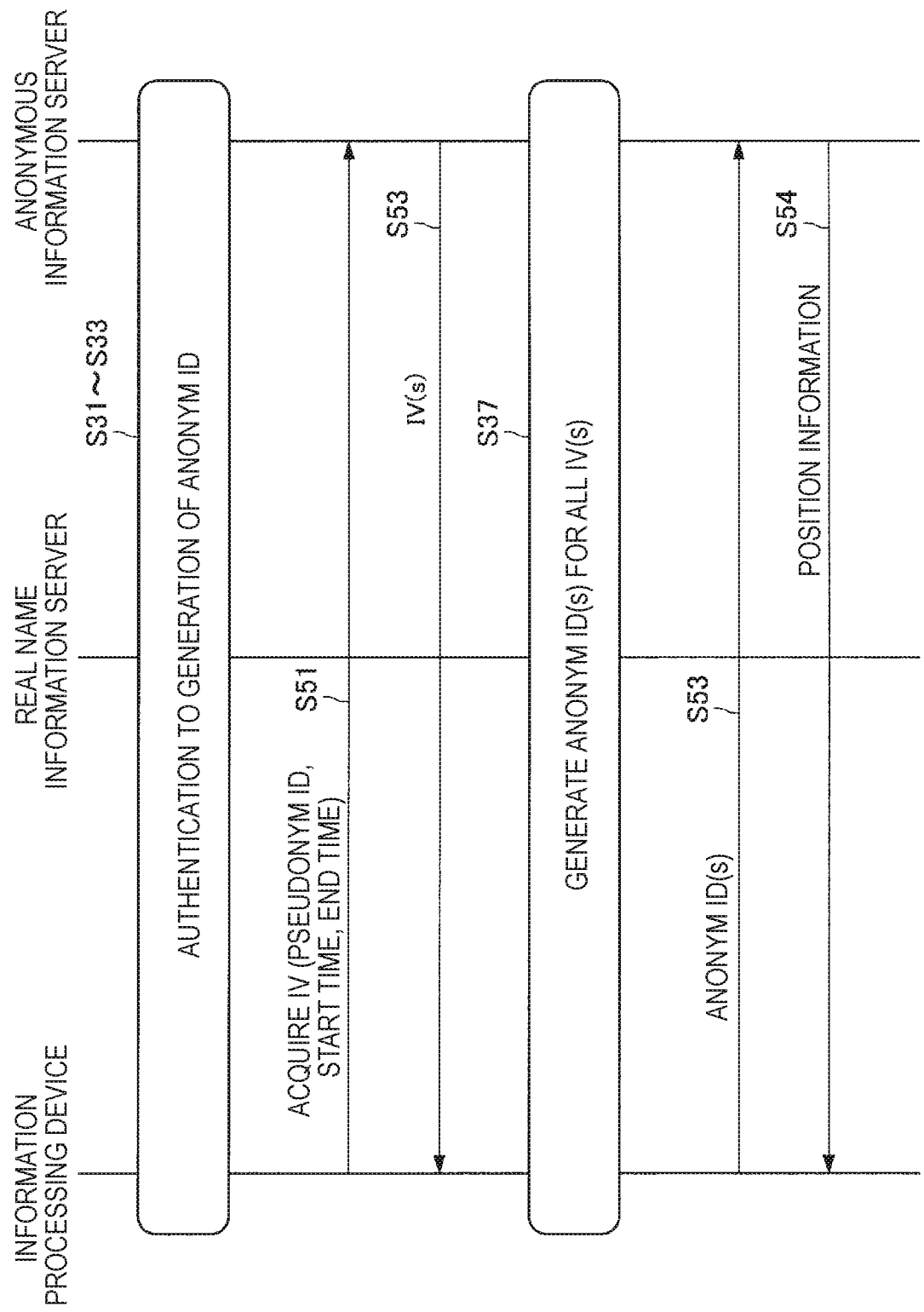
FIG. 15 is a flowchart illustrating an operation example from user authentication to acquisition of position information.

FIG. 15 is a flowchart illustrating an operation example from user authentication to acquisition of the position information. Note that the flowchart illustrated in FIG. 15 merely illustrates an example of operations from user authentication to acquisition of the position information. Therefore, the operations from user authentication to acquisition of the position information are not limited to the operation example in the flowchart illustrated in FIG. 15.

First, the operations from user authentication to generation of the pseudonym ID are executed as described above with reference to FIG. 13 (S31 to S33). The communication unit 140 transmits the pseudonym ID, a start time, and an end time to the anonymous information server 30 (S51). Note that the since start time and the end time are examples of information for specifying a range of IV, other information for specifying the range of IV may be used instead of the start time and the end time. For example, the information for identifying the range of IV may include only the start time or may include only the end time.

Here, the end time and the end time may be designated in any way. In one example, the start time and the end time may be a start time and an end time recorded in a predetermined application used by the user. The start time and the end time may be recorded by a user's predetermined operation (for example, an operation of pressing a button or the like). At this time, saving of the user's position information may also be started at the start time and may be ended at the end time.

Note that types of application used by the user are not limited. For example, the application used by the user may be an application for managing running of the user. At this time, the start time and the end time may be a running start time and a running end time recorded in the running application.

In the anonymous information server 30, if the pseudonym ID, the start time, and the end time are acquired by the data acquisition unit 311 via the communication unit 340, the processing execution unit 313 transmits IV(s) associated with a time from the start time to the end time in IV(s) associated with the pseudonym ID to the information processing device 10 via the communication unit 340. In the information processing device 10, the acquisition unit 111 acquires IV(s) via the communication unit 140.

The anonym ID generation unit 112 generates encrypted data obtained by encrypting all acquired IV(s) using the anonym ID key 152 as anonym ID(s) in accordance with all IV(s) (S37). Next, the anonym ID provision unit 113 provides the generated anonym ID(s) to the anonymous information server 30 via the communication unit 140 (S53). In the anonymous information server 30, the data acquisition unit 311 acquires the anonym ID(s) via the communication unit 340.

If the data acquisition unit 311 acquires the anonym ID(s) via the communication unit 340 in the anonymous information server 30, the processing execution unit 313 provides the position information associated with the anonym ID(s) to the information processing device 10 via the communication unit 340 (S54). Note that although the acquisition of the position information has been described as an example of the predetermined operation related to the position information here, other operations related to position information instead of or in addition to the acquisition of the position information may be performed.

For example, the position information acquired in this manner may be output by the output unit 160. Alternatively, the control unit 110 may generate predetermined display data on the basis of the position information acquired in this manner and cause the output 160 to output the display data. In a case in which the user is using a running application, for example, a running route may be calculated as the display data on the basis of the position information, and an average speed of the running may be calculated as the display data on the basis of the position information.

The embodiment of the present disclosure has been described above. According to the embodiment of the present disclosure, the risk value acquisition unit 312 acquires the risk value in a case in which user's position information leaks in the information processing device. Then, the processing execution unit 313 associates the anonym ID for identifying the position information with the position information. Also, in a case in which the risk value exceeds the predetermined threshold value, the processing execution unit 313 executes the processing of switching the anonym ID associated with the position information. According to such a configuration, it is possible to make it difficult to identify to which user leaked anonymous information relates even in a case in which the anonymous information has leaked. Also, the risk that an individual may be identified from a history (action history) of position information over a long period is reduced.

2. Description of Modification Example

Next, a modification example of the embodiment of the present disclosure will be described. The processing of switching the anonym ID associated with the position information has been described above as an example in which the association of the anonym ID with the position information is contrived. In the modification example of the embodiment of the present disclosure, processing of differentiating anonym IDs associated with a plurality of pieces of division information obtained through division of position information will be described as an example in which association of the anonym IDs with the position information is contrived.

Figure 16:
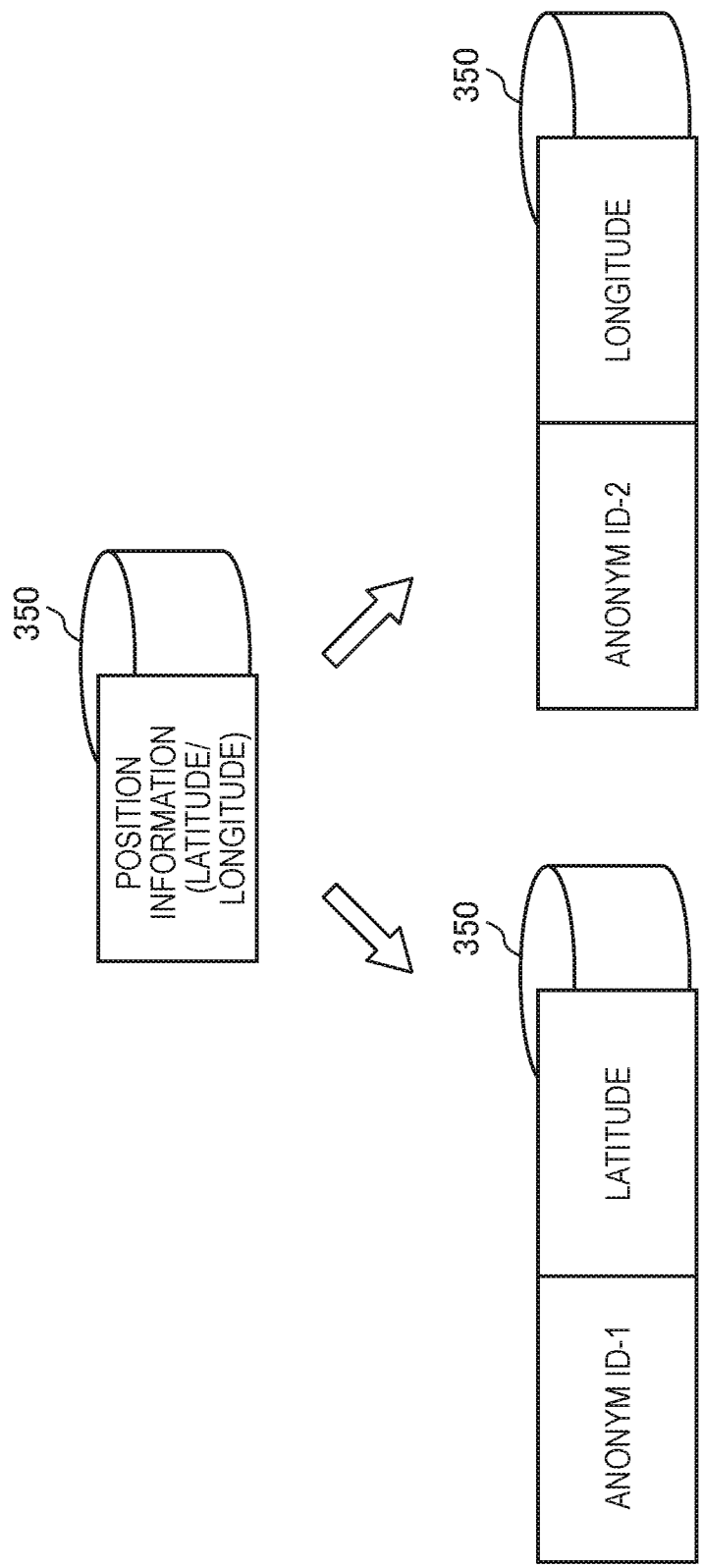
FIG. 16 is a diagram for explaining details of processing of differentiating anonym IDs associated with a plurality of pieces of division information obtained through division of position information.

FIG. 16 is a diagram for explaining details of the processing of differentiating the anonym IDs associated with a plurality of pieces of division information obtained through division of the position information. Although a latitude and a longitude will be exemplified and described as the plurality of pieces of division information, the plurality of pieces of division information are not limited to the latitude and the longitude. For example, the plurality of pieces of division information may further include an altitude in addition to the latitude and the longitude.

First, the operation from the user authentication to the generation of the anonym ID key are executed (S31 to S36) as described above with reference to FIG. 13. Next, the anonym ID provision unit 1133 provides the position information to the anonymous information server 30 via the communication unit 140. In the anonymous information server 30, the data acquisition unit 311 acquires the position information via the communication unit 340.

Here, the risk value acquisition unit 312 acquires the risk value in a case in which the position information leaks. The processing execution unit 313 does not divide the position information in a case in which the risk value does not exceed the threshold value (max). That is, the processing execution unit 313 provides IV (first identification data) to the information processing device 10 via the communication unit 340 in a case in which the risk value does not exceed the threshold value (max).

If the acquisition unit 111 acquires IV (first identification data) via the communication unit 140 in the information processing device 10, the anonym ID generation unit 112 generates an anonym ID-1 (first anonym ID) in accordance with IV (first identification data), and the anonym ID provision unit 113 provides the anonym ID-1 to the anonymous information server 30 via the communication unit 140. If the data acquisition unit 311 acquires the anonym ID-1 via the communication unit 340 in the anonymous information server 30, the processing execution unit 313 associates the anonym ID-1 with the position information and saves the position information and the anonym ID-1 (causes the position information and the anonym ID-1 to be stored) in the storage unit 350 in an associated state.

Meanwhile, the processing execution unit 313 performs the processing of dividing the position information into a latitude and a longitude and differentiating the anonym IDs associated with the latitude and the longitude in a case in which the risk value exceeds the threshold value (max). Here, a case in which the risk value exceeds the threshold value is assumed.

At this time, the processing execution unit 313 provides an anonym ID addition request to the information processing device 10 via the communication unit 340. If the acquisition unit 111 acquires the anonym ID addition request via the communication unit 140 in the information processing device 10, the anonym ID generation unit 112 provides a new IV addition request to the anonymous information server 30 via the communication unit 140.

If the new IV addition request is acquired by the data acquisition unit 311 via the communication unit 340 in the anonymous information server 30, the processing execution unit 313 adds IV (second identification data) associated with the pseudonym ID. Then, added IV (second identification data) is transmitted to the information processing device 10 by the communication unit 340. In the information processing device 10, the acquisition unit 111 acquires added IV (second identification data) via the communication unit 140.

The anonym ID generation unit 112 generates encrypted data obtained by encrypting added IV (second identification data) using the anonym ID key 152 as an anonym ID-2 (second anonym ID) in accordance with added IV (second identification data). The anonym ID provision unit 113 provides the anonym ID-2 to the anonymous information server 30 via the communication unit 140. In the anonymous information server 30, the data acquisition unit 311 acquires the anonym ID-2 via the communication unit 340.

If the data acquisition unit 311 acquires the anonym ID-2 via the communication unit 340 in the anonymous information server 30, the processing execution unit 313 associates the anonym ID-1 with the latitude and associates the anonym ID-2 with the longitude. Then, the processing execution unit 313 saves the latitude and the anonym ID-1 (causes the latitude and the anonym ID-1 to be stored) in the storage unit 350 in an associated state and saves the longitude and the anonym ID-2 (causes the longitude and the anonym ID-2 to be stored) in the storage unit 350 in an associated state.

The modification example of the embodiment of the present disclosure has been described above. According to the embodiment of the present disclosure, the risk value acquisition unit 312 acquires the risk value in a case in which user's position information leaks in the information processing device. Then, the processing execution unit 313 associates the anonym ID for identifying the position information with the position information. Also, the processing execution unit 313 executes the processing of differentiating the anonym IDs associated with the latitude and the longitude obtained through the division of the position information in a case in which the risk value exceeds the predetermined threshold value. According to such a configuration, it is possible to make it difficult to identify to which user leaked anonymous information relates even in a case in which the anonymous information has leaked. More specifically, since it is not possible to identify a correspondence between the latitude and the longitude, it is not possible to identify the position information from the leaked information. Also, since the position information cannot be identified, it is also difficult to estimate an individual from the leaked information.

3. Hardware Configuration Example

Next, with reference to FIG. 17, a hardware configuration of the information processing device 10 according to the embodiment of the present disclosure will be described. FIG. 17 is a block diagram illustrating the hardware configuration example of the information processing device 10 according to the embodiment of the present disclosure. Note that although the example illustrated in FIG. 17 is a hardware configuration example of the information processing device 10, a hardware configuration of each of the real name information server 20 and the anonymous information server 30 may be realized similarly to the hardware configuration example illustrated in FIG. 17.

As illustrated in FIG. 17, the information processing device 10 includes a central processing unit (CPU) 901, read only memory (ROM) 903, and random access memory (RAM) 905. In addition, the information processing device 10 may include a host bus 907, a bridge 909, an external bus 911, an interface 913, an input device 915, an output device 917, a storage device 919, a drive 921, a connection port 923, and a communication device 925. Moreover, the information processing device 10 may include an imaging device 933 and a sensor 935, as necessary. The information processing device 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the information processing device 10 according to various programs recorded in the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the information processing device 10. The input device 915 includes an input control circuit that generates input signals on the basis of information which is input by a user to output the generated input signals to the CPU 901. A user inputs various types of data and indicates a processing operation to the information processing device 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger.

The output device 917 includes a device that can visually or audibly report acquired information to a user. The output device 917 may be, for example, a display device such as a liquid crystal display (LCD), a plasma display panel (PDP), an organic electro-luminescence (EL) display, a projector, or a hologram display device, a sound output device such as a speaker or a headphone, or a printer. The output device 917 outputs a result obtained through a process performed by the information processing device 10, in the form of text or video such as an image, or sounds such as voice and audio sounds. In addition, the output device 917 may include a light or the like to light the surroundings.

The storage device 919 is a device for data storage that is an example of the storage unit of the information processing device 10. The storage device 919 includes, for example, a magnetic storage unit device such as a hard disk drive (HDD), a semiconductor storage device, an optical storage device, or a magneto-optical storage device. The storage device 919 stores therein various data and programs executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 10. The drive 921 reads out information recorded on the mounted removable recording medium 927, and outputs the information to the RAM 905. The drive 921 writes the record into the mounted removable recording medium 927.

The connection port 923 is a port used to directly connect equipment to the information processing device 10. The connection port 923 may be a USB (Universal Serial Bus) port, an IEEE1394 port, and a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the information processing device 10 and the external connection equipment 929.

The communication device 925 is a communication interface including, for example, a communication device for connection to the communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio communication, or satellite communication.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image.

The sensor 935 is various sensors such as a ranging sensor, an acceleration sensor, a gyro sensor, a geomagnetic sensor, a vibration sensor, an optical sensor, and a sound sensor. The sensor 935 acquires information regarding a state of the information processing device 10 such as a posture of a housing of the information processing device 10, and information regarding an environment surrounding the information processing device 10 such as luminous intensity and noise around the information processing device 10. The sensor 935 may include a global positioning system (GPS) sensor that receives GPS signals to measure latitude, longitude, and altitude of the device.

4. Conclusion

As described above, according to the embodiment of the present disclosure, there is provided the anonymous information server 30 including: the risk value acquisition unit 312 that acquires a risk value in a case in which a user's anonymous information leaks; and the processing execution unit 313 that associates an anonym ID for identifying the anonymous information with the anonymous information. In a case in which the risk value exceeds a predetermined threshold value, the processing execution unit 313 executes at least any of processing of switching the anonym ID associated with the anonymous information or processing of differentiating anonym IDs associated with a plurality of pieces of division information obtained through division of the anonymous information. According to such a configuration, it is possible to make it difficult to identify to which user leaked anonymous information relates even in a case in which the anonymous information has leaked.

In addition, there is provided the information processing device 10 including: the anonym ID generation unit 112 that generates an anonym ID for identifying a user's anonymous information; and the anonym ID provision unit 113 that provides the anonym ID and the anonymous information to the anonymous information server 30. In a case in which a risk value when the anonymous information leaks exceeds a predetermined threshold value, the anonym ID generation unit 112 executes at least any of processing of newly generating an anonym ID associated with the anonymous information or processing of generating anonym IDs associated with a plurality of pieces of division information obtained through division of the anonymous information. According to such a configuration, it is possible to make it difficult to identify to which user leaked anonymous information relates in a case in which the anonymous information has leaked.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the position of each configuration is not particularly limited as long as the aforementioned operations of the information processing device 10 are realized. In a specific example, a part or all of the respective blocks that the control unit 110 has (the acquisition unit 111, the anonym ID generation unit 112, and the anonym ID provision unit 113) may exist in a server or the like. In this manner, the information processing device 10 may be achieved by so-called cloud computing.

In addition, it is also possible to create a computer program for causing hardware such as CPU, ROM, and RAM, which are embedded in a computer, to execute functions equivalent to the functions of the control unit 110. Moreover, it may be possible to provide a computer-readable recording medium having the program recorded thereon.

Also, mapping keys of some types are conceivable. For example, a key common to a plurality of applications (hereinafter, also referred to as an "application common key"), a key specific to each user (hereinafter, also referred to as a "user specific key"), a key specific to each information processing device 10 (hereinafter, also referred to as a "device specific key"), and the like are exemplified.

In a case in which the application common key is used as a mapping key, uniqueness of a pseudonym ID generated through encryption of the user ID using the application common key is secured. However, in a case in which the application common key is used as a mapping key, it is necessary to provide a device security mechanism in order to prevent improper extraction of the application common key from the device and acquisition of a result of the encryption using the application common key through inputs of arbitrary values. In order to realize such a security mechanism, a device that is safe in terms of hardware may be prepared, or a safe application common key may be incorporated in obfuscated software.

In a case in which the user specific key is used as a mapping key, uniqueness of the pseudonym ID generated through encryption of the user ID using the user specific key is not secured. Therefore, it is necessary to regenerate the user specific key and the like in a case in which a plurality of pseudonym IDs coexist. However, it is considered that since an attacker can know only his/her own key in a case in which the user specific key is used as a mapping key, security required for the device is not as high as that in the case in which an application common key is used as a mapping key. Also, a safe backup restoring function for the user specific key is required in order to take over data among a plurality of devices when the devices are replaced, for example. Note that the user specific key may be downloaded from a server or may be generated such that the user specific key has specific number randomness in the device.

In a case in which the device specific key is used as a mapping key, uniqueness of the pseudonym ID generated through encryption of the user ID using the device specific key is not secured similar to the case in which the user specific key is used as a mapping key. Therefore, it is necessary to regenerate the device specific key in a case in which a plurality of pseudonym IDs coexist. Also, it is considered that security required for the device in a case in which the device specific key is used as a mapping key is similar to that in the case in which the user specific key is used as a mapping key. Note that the device specific key is applied to a case in which data is not shared with other devices.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A server device including:

a risk value acquisition unit that acquires a risk value in a case in which a user's anonymous information leaks; and a processing execution unit that associates an anonym ID for identifying the anonymous information with the anonymous information, in which in a case in which the risk value exceeds a predetermined threshold value, the processing execution unit executes at least any of processing of switching the anonym ID associated with the anonymous information or processing of differentiating anonym IDs associated with a plurality of pieces of division information obtained through division of the anonymous information.

(2)

The server device according to (1), in which the processing execution unit associates first identification data with encrypted data of a user ID in a case in which the encrypted data is acquired from an information processing device and associates a first anonym ID in accordance with the first identification data with first anonymous information in a case in which the first anonymous information and the first anonym ID are acquired from the information processing device.

(3)

The server device according to (2), in which the risk value acquisition unit acquires a risk value in a case in which second anonymous information leaks if the first anonym ID and the second anonymous information are acquired from the information processing device, and the processing execution unit associates second identification data with the encrypted data in a case in which the risk value exceeds the threshold value and associates a second anonym ID in accordance with the second identification data with the second anonymous information in a case in which the second anonym ID is acquired from the information processing device.

(4)

The server device according to (3), in which the processing execution unit associates the first anonym ID with the second anonymous information in a case in which the risk value does not exceed the threshold value.

(5)

The server device according to any one of (2) to (4), in which the processing execution unit provides the first identification data associated with the encrypted data to the information processing device in a case in which the encrypted data is acquired again from the information processing device and executes a predetermined operation related to the first anonymous information associated with a first anonym ID in accordance with the first identification data in a case in which the first anonym ID is acquired from the information processing device.

(6)

The server device according to (1), in which the processing execution unit associates first identification data with encrypted data of a user ID in a case in which the anonymous information and the encrypted data are acquired from an information processing device, associates second identification data with the encrypted data in a case in which the risk value exceeds the threshold value, and associates a first anonym ID in accordance with the first identification data with first division information and associates a second anonym ID in accordance with the second identification data with second division information in a case in which the first anonym ID and the second anonym ID are acquired from the information processing device.

(7)

The server device according to (6), in which the processing execution unit provides the first identification data to the information processing device in a case in which the risk value does not exceed the threshold value and associates the first anonym ID in accordance with the first identification data with the anonymous information in a case in which the first anonym ID is acquired from the information processing device.

(8)

The server device according to any one of (1) to (7), in which the risk value acquisition unit acquires the risk value on the basis of at least any of the anonymous information or information related to the anonymous information.

(9)

An information management method including:

acquiring a risk value in a case in which a user's anonymous information leaks;

associating an anonym ID for identifying the anonymous information with the anonymous information; and in a case in which the risk value exceeds a predetermined threshold value, executing, by a processor, at least any of processing of switching the anonym ID associated with the anonymous information or processing of differentiating anonym IDs associated with a plurality of pieces of division information obtained through division of the anonymous information.

(10)

A program for causing a computer to function as a server device including:

a risk value acquisition unit that acquires a risk value in a case in which a user's anonymous information leaks; and a processing execution unit that associates an anonym ID for identifying the anonymous information with the anonymous information, in which in a case in which the risk value exceeds a predetermined threshold value, the processing execution unit executes at least any of processing of switching the anonym ID associated with the anonymous information or processing of differentiating anonym IDs associated with a plurality of pieces of division information obtained through division of the anonymous information.

(11)

An information processing device including:

an anonym ID generation unit that generates an anonym ID for identifying a user's anonymous information; and an anonym ID provision unit that provides the anonym ID and the anonymous information to a server device, in which in a case in which a risk value when the anonymous information leaks exceeds a predetermined threshold value, the anonym ID generation unit executes at least any of processing of newly generating an anonym ID associated with the anonymous information or processing of generating anonym IDs associated with a plurality of pieces of division information obtained through division of the anonymous information.

(12)

The information processing device according to (11), in which the anonym ID generation unit provides encrypted data of the user ID to the server device, acquires first identification data associated with the encrypted data from the server device, and generates a first anonym ID in accordance with the first identification data, and the anonym ID provision unit provides the first anonym ID and first anonymous information to the server device.

(13)

The information processing device according to (12), in which the anonym ID generation unit provides the first anonym ID and second anonymous information to the server device, and in a case in which a risk value when the second anonymous information leaks exceeds a threshold value, acquires second identification data associated with the encrypted data from the server device, and generates a second anonym ID in accordance with the second identification data, and the anonym ID provision unit provides the second anonym ID to the server device.

(14)

The information processing device according to (13), in which in a case in which the risk value when the second anonymous information leaks does not exceed the threshold value, the anonym ID generation unit provides the first anonym ID to the server device.

(15)

The information processing device according to any one of (12) to (14), in which the anonym ID generation unit provides the encrypted data again to the server device, acquires the first identification data associated with the encrypted data from the server device, and generates a first anonym ID in accordance with the first identification data, and the anonym ID provision unit provides the first anonym ID to the server device.

(16)

The information processing device according to (11), in which the anonym ID generation unit provides the anonymous information and encrypted data of a user ID to the server device, and in a case in which a risk value when the anonymous information leaks exceeds a threshold value, acquires first identification data and second identification data associated with the encrypted data from the server device, and generates a first anonym ID in accordance with the first identification data and a second anonym ID in accordance with the second identification data, and the anonym ID provision unit provides the first anonym ID and the second anonym ID to the server device.

(17)

The information processing device according to (16), in which the anonym ID generation unit provides the anonymous information and the encrypted data to the server device, and in a case in which the risk value does not exceed the threshold value, acquires the first identification data associated with the encrypted data from the server device, and generates the first anonym ID in accordance with the first identification data, and the anonym ID provision unit provides the first anonym ID to the server device.

(18)

The information processing device according to any one of (11) to (17), in which the risk value is acquired by the server device on the basis of at least any of the anonymous information or information related to the anonymous information.

(19)

An information processing method including:

generating an anonym ID for identifying a user's anonymous information;

providing the anonym ID and the anonymous information to a server device; and in a case in which a risk value when the anonymous information leaks exceeds a predetermined threshold value, executing, by a processor, at least any of processing of newly generating an anonym ID associated with the anonymous information or processing of generating anonym IDs associated with a plurality of pieces of division information obtained through division of the anonymous information.

(20)

A program for causing a computer to function as an information processing device including:

an anonym ID generation unit that generates an anonym ID for identifying a user's anonymous information; and an anonym ID provision unit that provides the anonym ID and the anonymous information to a server device, in which in a case in which a risk value when the anonymous information leaks exceeds a predetermined threshold value, the anonym ID generation unit executes at least any of processing of newly generating an anonym ID associated with the anonymous information or processing of generating anonym IDs associated with a plurality of pieces of division information obtained through division of the anonymous information.

REFERENCE SIGNS LIST 1 information processing system
10 information processing device
110 control unit
111 acquisition unit
112 anonym ID generation unit
113 anonym ID provision unit
120 detection unit
130 input unit
140 communication unit
150 storage unit
151 mapping key
152 anonym ID key
160 output unit
20 real name information server
210 control unit
240 communication unit
250 storage unit
30 anonymous information server
310 control unit
311 data acquisition unit
312 risk value acquisition unit
313 processing execution unit
340 communication unit
350 storage unit

The invention claimed is:

1. A server device, comprising:
a central processing unit (CPU) configured to:
acquire encrypted data of a user identification (ID) from an information processing device;
associate first identification data with the encrypted data of the user ID;
acquire first anonymous information and a first anonym ID of a plurality of anonym IDs from the information processing device, wherein
the first anonym ID is based on the first identification data, and
the first anonym ID is for identification of the first anonymous information;
associate the first anonym ID with the first anonymous information;
acquire second anonymous information from the information processing device, wherein the second anonymous information is associated with the first anonym ID;
acquire, based on the acquisition of the second anonymous information, a risk value of leakage of the second anonymous information; and
execute, in a case where the risk value exceeds a threshold value, a process of differentiation of the plurality of anonym IDs, wherein
each anonym ID of the plurality of anonym IDs is associated with a respective piece of division information of a plurality of pieces of division information, and
the plurality of pieces of division information is based on division of the second anonymous information.

2. The server device according to claim 1, wherein
the CPU is further configured to acquire a second anonym ID of the plurality of anonym IDs from the information processing device, and
the second anonym ID is based on second identification data.

3. The server device according to claim 1, wherein the CPU is further configured to associate the first anonym ID with the second anonymous information in a case where the risk value does not exceed the threshold value.

4. The server device according to claim 1, wherein the CPU is further configured to:
transmit the first identification data associated with the encrypted data to the information processing device based on the acquisition of the encrypted data; and
execute an operation related to the first anonymous information associated with the first anonym ID based on the acquisition of the first anonym ID.

5. The server device according to claim 1, wherein the CPU is further configured to:
acquire a second anonym ID of the plurality of anonym IDs from the information processing device;

associate the first anonym ID with a first piece of division information of the plurality of pieces of division information; and associate the second anonym ID with a second piece of division information of the plurality of pieces of division information.

6. The server device according to claim 5, wherein the CPU is further configured to:

transmit the first identification data to the information processing device in a case where the risk value does not exceed the threshold value; and associate the first anonym ID with the second anonymous information based on the transmitted first identification data.

7. The server device according to claim 1, wherein the CPU is further configured to acquire the risk value based on specific information related to the second anonymous information.

8. An information management method, comprising:

acquiring encrypted data of a user identification (ID) from an information processing device;

associating first identification data with the encrypted data of the user ID;

acquiring first anonymous information and a first anonym ID of a plurality of anonym IDs from the information processing device, wherein the first anonym ID is based on the first identification data, and the first anonym ID is for identification of the first anonymous information;

associating the first anonym ID with the first anonymous information;

acquiring second anonymous information from the information processing device, wherein the second anonymous information is associated with the first anonym ID;

acquiring, based on the acquisition of the second anonymous information, a risk value of leakage of the second anonymous information; and executing, in a case where the risk value exceeds a threshold value, a process of differentiation of the plurality of anonym IDs, wherein each anonym ID of the plurality of anonym IDs is associated with a respective piece of division information of a plurality of pieces of division information, and the plurality of pieces of division information is based on division of the second anonymous information.

9. A non-transitory computer-readable medium having stored thereon, computer-executable instructions, which when executed by a computer, cause the computer to execute operations, the operations comprising:

acquiring encrypted data of a user identification (ID) from an information processing device;

associating first identification data with the encrypted data of the user ID;

acquiring first anonymous information and a first anonym ID of a plurality of anonym IDs from the information processing device, wherein the first anonym ID is based on the first identification data, and the first anonym ID is for identification of the first anonymous information;

associating the first anonym ID with the first anonymous information;

acquiring second anonymous information from the information processing device, wherein the second anonymous information is associated with the first anonym ID;

acquiring, based on the acquisition of the second anonymous information, a risk value of leakage of the second anonymous information; and executing, in a case where the risk value exceeds a threshold value, a process of differentiation of the plurality of anonym IDs, wherein each anonym ID of the plurality of anonym IDs is associated with a respective piece of division information of a plurality of pieces of division information, and the plurality of pieces of division information is based on division of the second anonymous information.

10. An information processing device, comprising:

a central processing unit (CPU) configured to:

transmit encrypted data of a user identification (ID) to a server device;

acquire first identification data associated with the encrypted data from the server device;

generate a first anonym ID, of a plurality of anonym IDs, based on the first identification data, wherein the first anonym ID is for identification of first anonymous information;

transmit the first anonymous information and the first anonym ID to the server device;

transmit second anonymous information to the server device, wherein the second anonymous information is associated with the first anonym ID; and execute, in a case where a risk value of leakage of the second anonymous information exceeds a threshold value, a process of generation of a second anonym ID of the plurality of anonym IDs for differentiation of the plurality of anonym IDs, wherein each anonym ID of the plurality of anonym IDs is associated with a respective piece of division information of a plurality of pieces of division information, and the plurality of pieces of division information is based on division of the second anonymous information.

11. The information processing device according to claim 10, wherein the CPU is further configured to transmit the second anonym ID to the server device.

12. The information processing device according to claim 11, wherein the CPU is further configured to transmit the first anonym ID to the server device in a case where the risk value of the leakage of the second anonymous information does not exceed the threshold value.

13. The information processing device according to claim 10, wherein the CPU is further configured to:

acquire second identification data from the server device in a case where the risk value of the leakage of the second anonymous information exceeds the threshold value, wherein the second identification data is associated with the encrypted data;

transmit the first anonym ID to the server device for association of the first anonym ID with a first piece of division information of the plurality of pieces of division information; and transmit the second anonym ID to the server device for association of the second anonym ID with a second piece of division information of the plurality of pieces of division information, wherein the second anonym ID is based on the second identification data.

14. The information processing device according to claim 13, wherein in a case where the risk value does not exceed the threshold value, the CPU is further configured to:

acquire the first identification data associated with the encrypted data from the server device;

generate the first anonym ID based on the first identification data; and transmit the first anonym ID to the server device.

15. The information processing device according to claim 10, wherein the risk value is acquired by the server device based on specific information related to the second anonymous information.

16. An information processing method, comprising:

transmitting encrypted data of a user identification (ID) to a server device;

acquiring first identification data associated with the encrypted data from the server device;

generating a first anonym ID, of a plurality of anonym IDs, based on the first identification data, wherein the first anonym ID is for identification of first anonymous information;

transmitting the first anonymous information and the first anonym ID to the server device;

transmitting second anonymous information to the server device, wherein the second anonymous information is associated with the first anonym ID; and executing, in a case where a risk value of leakage of the second anonymous information exceeds a threshold value, a process of generation of a second anonym ID of the plurality of anonym IDs for differentiation of the plurality of anonym IDs, wherein each anonym ID of the plurality of anonym IDs is associated with a respective piece of division information of a plurality of pieces of division information, and the plurality of pieces of division information is based on division of the second anonymous information.

17. A non-transitory computer-readable medium having stored thereon, computer-executable instructions, which when executed by a computer, cause the computer to execute operations, the operations comprising:

transmitting encrypted data of a user identification (ID) to a server device;

acquiring first identification data associated with the encrypted data from the server device;

generating a first anonym ID, of a plurality of anonym IDs, based on the first identification data, wherein the first anonym ID is for identification of first anonymous information;

transmitting the first anonymous information and the first anonym ID to the server device;

transmitting second anonymous information to the server device, wherein the second anonymous information is associated with the first anonym ID; and executing, in a case where a risk value of leakage of the second anonymous information exceeds a threshold value, a process of generation of a second anonym ID of the plurality of anonym IDs for differentiation of the plurality of anonym IDs, wherein each anonym ID of the plurality of anonym IDs is associated with a respective piece of division information of a plurality of pieces of division information, and the plurality of pieces of division information is based on division of the second anonymous information.

* * * * *